(12) United States Patent
Nishimura et al.

(10) Patent No.: US 8,903,164 B2
(45) Date of Patent: Dec. 2, 2014

(54) DISPARITY CALCULATING APPARATUS AND DISPARITY CALCULATING METHOD

(71) Applicant: Panasonic Corporation, Osaka (JP)

(72) Inventors: Akio Nishimura, Osaka (JP); Tomohide Ishigami, Osaka (JP); Koichi Ito, Miyagi (JP); Takafumi Aoki, Miyagi (JP)

(73) Assignee: Panasonic Corporation, Osaka (JP)

( * ) Notice: Subject to any disclaimer, the term of this patent is extended or adjusted under 35 U.S.C. 154(b) by 240 days.

(21) Appl. No.: 13/861,717

(22) Filed: Apr. 12, 2013

(65) Prior Publication Data

US 2013/0294681 A1 Nov. 7, 2013

(30) Foreign Application Priority Data

Apr. 17, 2012 (JP) ................................ 2012-094195
Apr. 23, 2012 (JP) ................................ 2012-098135

(51) Int. Cl.
*G06K 9/00* (2006.01)
*H04N 13/00* (2006.01)
*G06T 7/00* (2006.01)

(52) U.S. Cl.
CPC .......... *H04N 13/0022* (2013.01); *G06T 7/0022* (2013.01); *G06T 2207/10012* (2013.01); *G06T 2207/20056* (2013.01)
USPC ....................................................... 382/154

(58) Field of Classification Search
CPC ..................... G01C 11/06; G06K 9/32; G06T 2207/30201; G06T 7/0022; G06T 7/0075
USPC ........................................................ 382/154
See application file for complete search history.

(56) References Cited

U.S. PATENT DOCUMENTS 7,697,749 B2 * 4/2010 Ogawa .......................... 382/154
8,355,564 B2    1/2013 Aoki et al.
8,509,519 B2 * 8/2013 Wang ............................. 382/154

(Continued)

FOREIGN PATENT DOCUMENTS

| JP | 3347608 | 11/2002 |
|---|---|---|
| JP | 2005-165969 | 6/2005 |
| JP | 2008-90583 | 4/2008 |
| JP | 4382797 | 12/2009 |

OTHER PUBLICATIONS

Pedro F. Felzenszwalb, "Efficient Graph-Based Image Segmentation", International Journal of Computer Vision, vol. 59, No. 2, Sep. 2004.

*Primary Examiner* — Tom Y Lu
(74) *Attorney, Agent, or Firm* — Wenderoth, Lind & Ponack, LLP

(57) ABSTRACT

A disparity calculating apparatus which calculates a disparity value from a stereo image including first and second images includes: an image dividing unit which divides the first image into segments; a reference point determining unit which sets reference points to the first image; a corresponding point detecting unit which (i) calculates, for each reference point, a corresponding point which is included in the second image and corresponds to the reference point, based on phase information of images obtained by performing Fourier transform on the first image and the second image, (ii) calculates a disparity value using the reference point and each corresponding point, and (iii) calculates a reliability of the disparity value; and a disparity assigning unit which assigns each of the segments which includes a corresponding one of the reference points the disparity value and the reliability calculated by the corresponding point detecting unit.

15 Claims, 18 Drawing Sheets

(56) References Cited

U.S. PATENT DOCUMENTS

| | | | |
|---|---|---|---|
| 8,619,148 B1 * | 12/2013 | Watts et al. | 348/218.1 |
| 2008/0240549 A1 * | 10/2008 | Koo et al. | 382/154 |
| 2009/0207238 A1 * | 8/2009 | Kim et al. | 348/51 |
| 2009/0304266 A1 | 12/2009 | Aoki et al. | |

\* cited by examiner

DISPARITY CALCULATING APPARATUS AND DISPARITY CALCULATING METHOD

CROSS REFERENCE TO RELATED APPLICATIONS

The present application is based on and claims priority of Japanese Patent Application No. 2012-094195 filed on Apr. 17, 2012 and No. 2012-096135 filed on Apr. 23, 2012. The entire disclosure of the above-identified application, including the specification, drawings and claims is incorporated herein by reference in its entirety.

FIELD

The present disclosure relates to a disparity calculating apparatus which calculates disparity information from a stereo image.

BACKGROUND

As a conventional method for calculating disparity information, there is a method using a two-dimensional phase only correlation (POC) (for example, see Patent Literature 1). As another conventional method for calculating disparity information, there is a method using a one-dimensional POC (for example, see Patent Literature 2). In addition, as a disparity calculating method using conventional segmentation, there is a method for dividing a reference image into small segments and estimating disparity values focusing on the boundary parts of the small segments (for example, see Patent Literature 3).

CITATION LIST

Patent Literature

[Patent Literature 1]
Japanese Patent No. 3347608
[Patent Literature 2]
Japanese Patent No. 4382797
[Patent Literature 3]
Japanese Unexamined Patent Application Publication No. 2005-165969

Non Patent Literature

[Non-Patent Literature 1]
"Efficient Graph-Based IMAGE Segmentation" written by PEDRO F. FELZENSZWALB, International Journal of Computer Vision 59 (2), 167-181, 2004

SUMMARY

Technical Problem

A desirable disparity calculating apparatus should be capable of calculating disparity information with high accuracy.

One or more non-limiting exemplary embodiments provide a disparity calculating apparatus capable of calculating disparity information with high accuracy.

Solution to Problem

A disparity calculating apparatus according to an aspect of the present disclosure is a disparity calculating apparatus which calculates disparity values from a stereo image including a first image and a second image, the disparity calculating apparatus including: an image dividing unit configured to divide the first image into a plurality of segments having consecutive and similar pixel values; a reference point determining unit configured to set a plurality of reference points in the first image; a corresponding point detecting unit configured to (i) calculate, for each of the reference points, a corresponding point which is included in the second image and corresponds to the reference point, based on phase information of images obtained by performing Fourier transform on a first segment of the first image and second segments of the second image, (ii) calculate a disparity value using the reference point and the corresponding point, and (iii) calculate a reliability of the disparity value, the first segment having a center which is the reference point and having a search window size, and each of the second segments having a center which is a corresponding point candidate and having the search window size; and a disparity assigning unit configured to assign each of the segments which includes a corresponding one of the reference points the disparity value and the reliability calculated for the reference point by the corresponding point detecting unit.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and the Drawings. The benefits and/or advantages may be individually obtained by the various embodiments and features of the Specification and Drawings, which need not all be provided in order to obtain one or more of such benefits and/or advantages.

Advantageous Effects

The present disclosure relates to a disparity calculating apparatus capable of calculating disparity information with high accuracy.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

Figure 1:
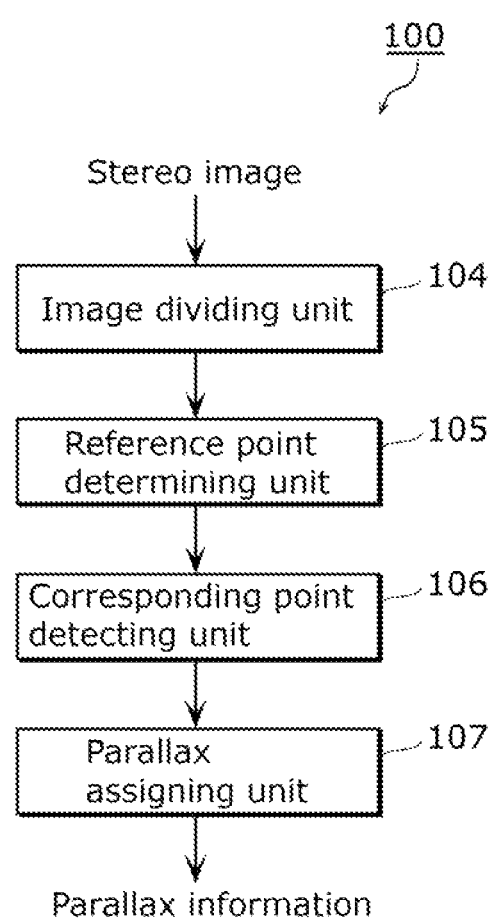
FIG. 1 is a block diagram of a disparity calculating apparatus according to Embodiment 1.

Underlying Knowledge Forming Basis of the Present Disclosure

The Inventors found that the disparity calculating apparatuses identified in the "Background" section have problems below.

The structure disclosed in Patent Literature 1 makes it possible to detect disparity values with high accuracy according to a two-dimensional POC method, but requires a large processing load in two-dimensional Fourier transform. On the other hand, the structure disclosed in Patent Literature 2 makes it possible to detect disparity values with high accuracy according to one-dimensional POC method which requires a smaller processing load than in a two-dimensional POC method. However, the Inventors found that both the two methods have a problem that disparity value detection accuracy significantly decreases at edge portions where the foreground and background coexist. The Inventors also found that the two methods have a problem that disparity value detection accuracy significantly decreases at edge portions where disparity values significantly vary due to occlusion.

In addition, the structure disclosed in Patent Literature 3 is intended to perform disparity value estimation by block matching such as Sum of Squared Difference (SSD) or Sum of Absolute Difference (SAD) easy to detect disparity values at boundary parts with adequate accuracy. In view of this, the Inventors found that the structure has a problem that the accuracy as a whole is low.

A disparity calculating apparatus according to an aspect of the present disclosure is a disparity calculating apparatus which calculates disparity values from a stereo image including a first image and a second image, the disparity calculating apparatus including: an image dividing unit configured to divide the first image into a plurality of segments having consecutive and similar pixel values; a reference point determining unit configured to set a plurality of reference points in the first image; a corresponding point detecting unit configured to (i) calculate, for each of the reference points, a corresponding point which is included in the second image and corresponds to the reference point, based on phase information of images obtained by performing Fourier transform on a first segment of the first image and second segments of the second image (ii) calculate a disparity value using the reference point and the corresponding point, and (iii) calculate a reliability of the disparity value, the first segment having a center which is the reference point and having a search window size, and each of the second segments having a center which is a corresponding point candidate and having the search window size; and a disparity assigning unit configured to assign each of the segments which includes a corresponding one of the reference points the disparity value and the reliability calculated for the reference point by the corresponding point detecting unit.

With this structure, the disparity calculating apparatus can calculate the highly accurate disparity information with edge shapes maintained. Furthermore, the disparity calculating apparatus can calculate disparity information with high accuracy using, in the corresponding point calculation processes, the phase information of the images already subjected to Fourier transform.

For example, the disparity calculating apparatus may further include a reliability determining unit configured to determine, for each of the segments, whether or not the assigned reliability is lower than a predetermined threshold value, and when the reliability assigned to a current one of the segments is lower than the threshold value, to give one of the reference point determining unit, the corresponding point detecting unit, and the disparity assigning unit an instruction for causing calculation, based on a modified condition, of a disparity value using the reference point and the corresponding point and a reliability of the disparity value.

When the assigned reliability is low, the disparity calculating apparatus configured as above can calculate the new disparity value under the modified condition, and thus can derive the highly accurate disparity information.

For example, the reference point determining unit may be configured: to set a plurality of reference point candidates in each of the segments; to set, for each reference point candidate, a first surrounding segment of a first size having a center which is the reference point: candidate, and a second surrounding segment of a second size having a center which is the reference point candidate, the second size being larger than the first size; to calculate, for each reference point candidate, a first segment size of a portion of the segment including the reference point candidate, the portion being included in the first surrounding segment; to calculate, for each reference point candidate, a second segment size of a portion of the segment including the reference point candidate, the portion being included in the second surrounding segment; to set, for each segment, priorities of the reference point candidates such that a higher priority is given for the reference point candidate having a larger first segment size, and when two or more of the first segment sizes are equal, a higher or highest priority is given for the reference point candidate having a larger or largest second segment size; and to select, based on the priorities, the reference point in each segment from among the reference point candidates.

With this structure, the disparity calculating apparatus can determine such an appropriate reference point with which there is a large possibility that the accuracy of the resulting disparity value is high.

For example, the first size may be equal to the search window size.

For example, the corresponding point detecting unit may be configured to calculate the corresponding point using a method other than a calculation method based on the phase information, when a ratio of the first segment size with respect to the segment size of the first surrounding segment is smaller than a predetermined value. When there is a small possibility that the method using phase information of Fourier transform images yields a disparity value with high accuracy, the disparity calculating apparatus configured as above calculates the disparity value using the other method. In this way, the disparity calculating apparatus can calculate such highly accurate disparity information.

For example, when the ratio of the first segment size of the portion of the segment which is a current processing target with respect to the segment size of the first surrounding segment is smaller than a predetermined value, the reference point determining unit may be configured to combine the current processing-target segment and one of neighboring segments which has color information similar to color information of the processing-target segment, and determine the reference point in the combined segment.

When there is a small possibility that the current segmentation can yield a disparity value with high accuracy, the disparity calculating apparatus configured as above combines the segments. In this way, the disparity calculating apparatus can calculate such highly accurate disparity information.

For example, when the reliability assigned to the current segment is lower than the threshold value, the reference point determining unit may be further configured to set a new reference point selected from among the reference point candidates, based on the priorities used as the modified condition, the corresponding point detecting unit may be configured to calculate a new corresponding point for the new reference point, calculate a disparity value using the new reference point and the new corresponding point, and calculate a reliability of the disparity value, and the disparity assigning unit may be configured to assign the current segment the disparity value and the reliability newly calculated by the corresponding point detecting unit.

When the assigned reliability is low, the disparity calculating apparatus configured as above can newly calculate the disparity value using the modified reference point, and thus can derive the highly accurate disparity information.

For example, when the reliability assigned to the current segment is lower than the threshold value, the reference point determining unit may be configured to reset the priorities to new priorities based on a modified first size obtained by increasing the first size, and set a reference point based on the modified priorities used as the modified condition, the corresponding point detecting unit may be configured to calculate a new corresponding point for the new reference point, calculate a disparity value using the new reference point and the new corresponding point, and calculate a reliability of the disparity value, and the disparity assigning unit may be configured to assign the current segment the disparity value and the reliability newly calculated by the corresponding point detecting unit.

When the assigned reliability is low, the disparity calculating apparatus configured as above can newly calculate the new disparity value using the first surrounding segment having the modified size, and thus can derive the highly accurate disparity information.

For example, the reference point determining unit may be configured to determine, for each segment, two or more reference points selected from among the plurality of reference point candidates, based on the priorities, the corresponding point detecting unit may be configured to calculate, based on the phase information, the corresponding point for each of the reference points in each segment, calculate a disparity value using the reference point and the corresponding point, and calculate a reliability of the disparity value, and the disparity assigning unit may be configured: to assign each segment a combination of a disparity value and reliability which is a highest reliability, selected from among combinations of the disparity values and the reliabilities calculated for the respective reference points in the segment by the corresponding point detecting unit; and when the reliability assigned to the current segment is lower than the threshold value, to newly calculate a disparity value and a reliability by performing weighted sum of the disparity values included in the combinations calculated for the current segment, based on the reliabilities, and assign the current segment the disparity value and the reliability, the weighted sum being performed as the modified condition.

When the assigned reliability is low, the disparity calculating apparatus configured as above can newly calculate, based on disparity values corresponding to the plurality of reference points, the disparity value to be assigned, and thus can derive the highly accurate disparity information.

For example, when the reliability assigned to the current segment is lower than the threshold value, the disparity assigning unit may be configured to newly calculate the disparity value and the reliability for the current segment by performing weighted sum of the disparity values included in the combinations calculated for the current segment, based on the reliabilities and a ratio of the second segment with respect to the second surrounding segment.

The disparity calculating apparatus configured as above calculates each of the disparity values to be assigned considering the ratio of the second segment size with respect to the segment size of the second surrounding segment, and thus can calculate the highly accurate disparity information.

For example, the corresponding point detecting unit may be configured to calculate the corresponding point for each of the reference points, based on phase information of images obtained by performing Fourier transform on one-dimensional images respectively included in the first image and the second image, and when the reliability assigned to the current segment is lower than the threshold value, the disparity assigning unit may be configured to newly calculate the disparity value and the reliability for the current segment by performing, based on the reliabilities, weighted sum of the disparity values included in the combinations calculated for the current segment, and assign the current segment the disparity value and the reliability.

The disparity calculating apparatus configured as above detects the corresponding point based on the phase information of the images obtained by performing Fourier transform on the one-dimensional images, and thus can reduce the processing load. The disparity calculating apparatus can also appropriately change the disparity value having a low reliability.

For example, the reference point determining unit may be configured to set a plurality of reference points in each segment, the corresponding point detecting unit may be configured to calculate the corresponding point for each of the reference points in each of the segments, based on phase information of images obtained by performing Fourier transform on a plurality of the images respectively included in the first image and the second image, calculate a disparity value using the reference point and the corresponding point, and calculate a reliability of the disparity value, and the disparity assigning unit may be configured to (i) determine, for each of the reference points calculated for each segment by the corresponding point detecting unit, whether or not there are three or more combinations of disparity values and reliabilities which are reliabilities higher than a predetermined threshold value, and, when the three or more combinations having the reliabilities higher than the predetermined threshold value exist: in a current one of the segments, (ii) calculate a two-dimensional distribution of the disparity values related to the current segment using the three or more combinations, and (iii) assign the current segment the two-dimensional distribution of the disparity values.

The disparity calculating apparatus configured as above calculates the distribution of disparity values in the segment, and thus can calculate the highly accurate disparity information.

For example, the disparity calculating apparatus may further include: a reference point deciding unit configured to modify the reliability calculated by the corresponding point detecting unit, wherein the reference point deciding unit may be configured: to set, for each reference point, a first surrounding segment: having a center which is the reference point; to calculate a first segment size of a portion of the segment including the reference point, the portion being included in the first surrounding segment; and to decrease the reliability more significantly as a ratio of the first segment size with respect to the first surrounding segment becomes smaller, and the disparity assigning unit may be configured to assign the segment the reliability modified by the reference point deciding unit and the disparity value.

The disparity calculating apparatus configured as above can select each of the disparity values to be assigned considering the ratio of the first segment size with respect to the segment size of the first surrounding segment, and thus can calculate the highly accurate disparity information.

In addition, a disparity calculating method according to an aspect of the present invention is a disparity calculating method of calculating disparity values from a stereo image including a first image and a second image, the disparity calculating method including dividing the first image into a plurality of segments having consecutive and similar pixel values; setting a plurality of reference points in the first image; (i) calculating, for each of the reference points, a corresponding point which is included in the second image and corresponds to the reference point, based on phase information of images obtained by performing Fourier transform on a first segment of the first image and second segments of the second image, calculating a disparity value using the reference point and the corresponding point, and (iii) calculating a reliability of the disparity value, the first segment having a center which is the reference point and having a search window size, and each of the second segments having a center which is a corresponding point candidate and having the search window size; and assigning each of the segments which includes a corresponding one of the reference points the disparity value and the reliability calculated for the reference point in the calculating of a corresponding point.

The disparity calculating method as descried above makes it possible to calculate the highly accurate disparity information with the edge shapes maintained. Furthermore, the disparity calculating method makes it possible to calculate the disparity information with high accuracy using, in the corresponding point calculation processes, the phase information of the images already subjected to Fourier transform.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments of the present disclosure are described in detail with reference to the Drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims of the present disclosure. Therefore, among the structural elements in the following exemplary embodiments, structural elements not recited in any one of the independent claims which define the most generic concept are described as arbitrary structural elements.

Embodiment 1

First, a description is given of a basic structure of a disparity calculating apparatus 100 according to an embodiment.

FIG. 1 is a block diagram of a schematic structure of the disparity calculating apparatus 100 according to this embodiment.

The disparity calculating apparatus 100 generates the disparity value from a stereo image including a first image and a second image. The disparity calculating apparatus 100 includes an image dividing unit 104, a reference point determining unit 105, a corresponding point detecting unit 106, and a disparity assigning unit 107.

The image dividing unit 104 divides the first image into a plurality of segments having consecutive and similar pixel values. In other words, the image dividing unit 104 divides the first image into the plurality of segments having edges each of which is an segment boundary.

The reference point determining unit 105 sets a plurality of reference points in the first image.

The corresponding point detecting unit 106 calculates, for each of the reference points, a corresponding point which is included in the second image and corresponds to the reference point, based on phase information of images obtained by performing Fourier transform on a first segment of the first image and a second segment of the second image. Here, the first segment has a center which is the reference point and has a search window size, and the second segment has a center which is a corresponding point candidate and has a search window size. Next, the corresponding point detecting unit 106 calculates the disparity value based on the reference point and the corresponding point, and calculates the reliability of the disparity value.

The disparity assigning unit 107 assigns the segment including the reference point the disparity value and the reliability thereof calculated for each of the reference points by the corresponding point detecting unit 106. Hereinafter, a description is given of a basic structure of the disparity calculating apparatus 100 according to this embodiment and operations performed thereby.

Figure 2:
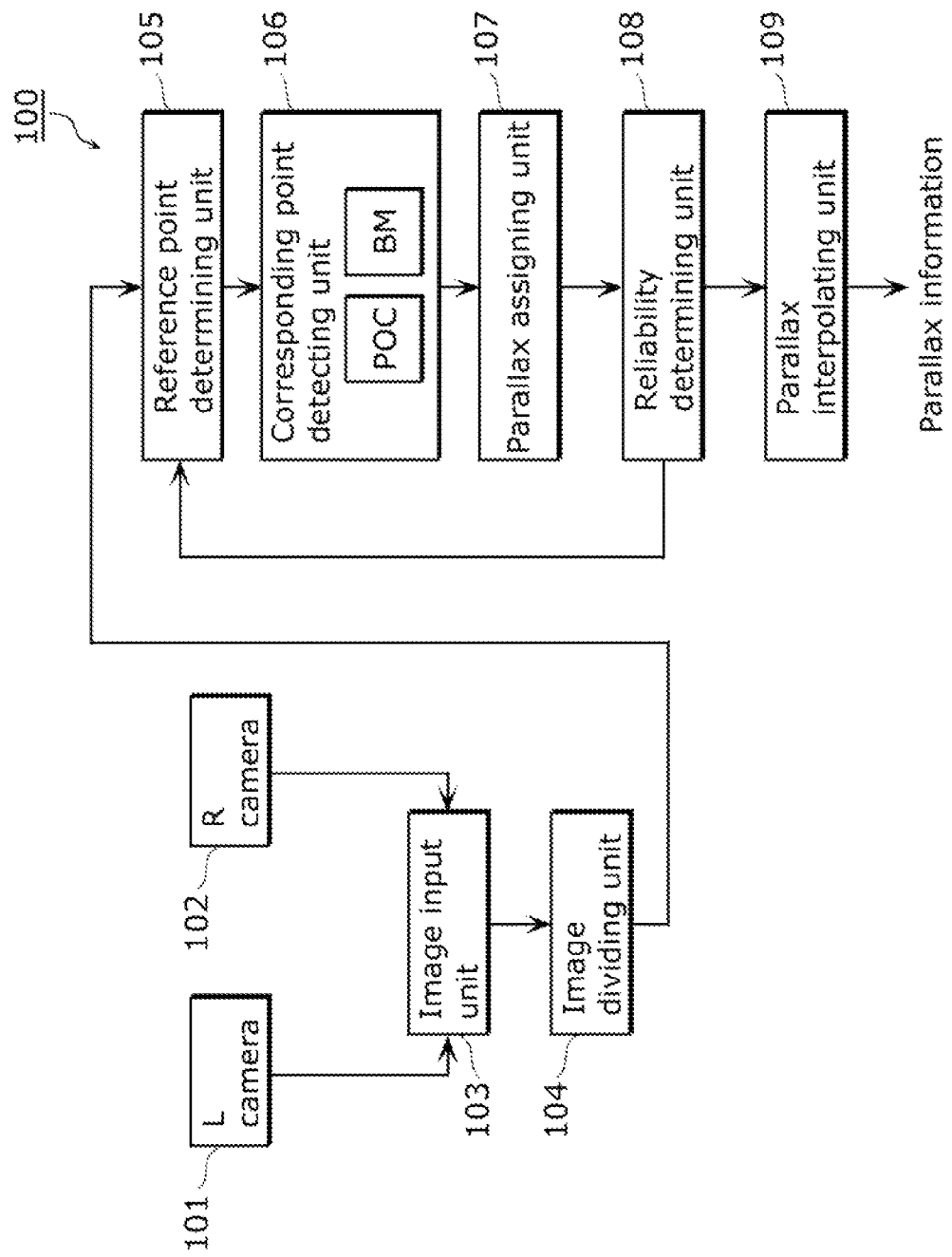
FIG. 2 is a block diagram of the disparity calculating apparatus according to Embodiment 1.

FIG. 2 is a block diagram of the disparity calculating apparatus 100 according to Embodiment 1 of the present disclosure. The disparity calculating apparatus 100 includes an L camera 101, an R camera 102, an image input unit 103, an image dividing unit 104, a reference point determining unit 105, a corresponding point detecting unit 106, a disparity assigning unit 107, a reliability determining unit 108, and a disparity interpolating unit 109.

Figure 3:
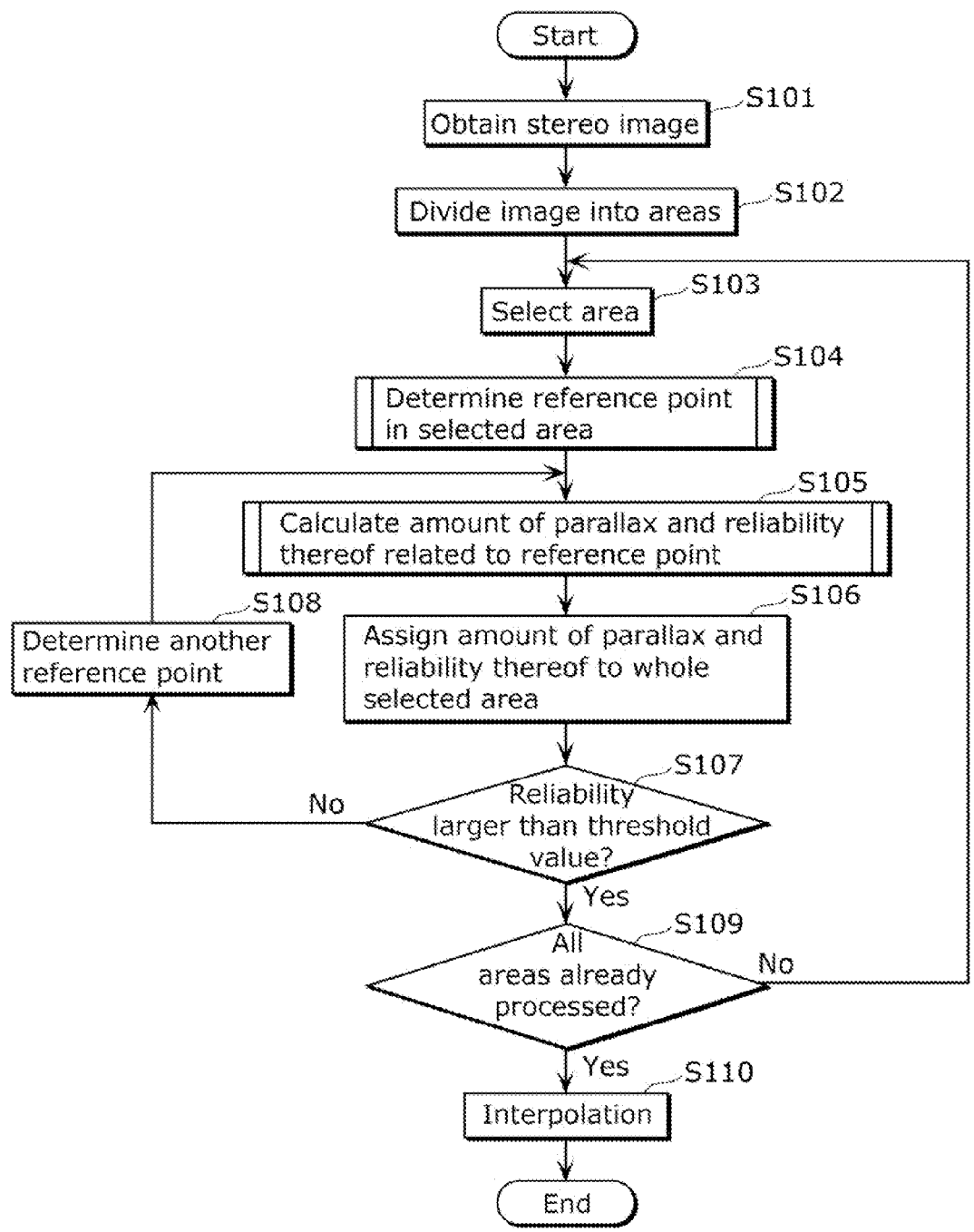
FIG. 3 is a flowchart of disparity calculation processes according to Embodiment 1.

In addition, FIG. 3 is a flowchart of disparity value calculating processes performed by the disparity calculating apparatus 100.

The L camera 101 and the R camera 102 are arranged in a direction to be approximately in parallel and apart by a certain distance. In other words, the stereo image includes the two images obtained by capturing images of the same subject (scene) at different positions (viewpoints).

The image input unit 103 obtains the stereo image from images captured by the L camera 101 and the R camera 102

(S101). Next, the image input unit 103 performs a parallelization process by executing calibration on the obtained stereo image according to parameters of the respective camera as necessary. The image input unit 103 outputs the stereo image obtained through these processes to the image dividing unit 104.

The image dividing unit 104 divides at least one image (the first image) among the left and right images included in the stereo image into the plurality of segments having the edges each of which is the segment boundary (S102). In other words, the image dividing unit 104 divides the first image into the plurality of segments having consecutive and similar pixel values. For example, the image dividing unit 104 divides the first image into small segments utilizing the Graph-Based Segmentation method (see Non-patent Literature 1) or algorithms according to the MeanShift method or the like.

Furthermore, when the width or height of a given small segment is smaller than an initial value of a later-described first window size, the image dividing unit 104 combines the small segment and one of neighboring small segments which has color information similar to color information of the small segment.

In addition, the disparity calculating apparatus 100 assigns the disparity value and the reliability thereof to each of n small segments divided in the above-described process by performing processes described below.

The following processes for each small segment are performed by the reference point determining unit 105, the corresponding point detecting unit 106, the disparity assigning unit 107, and the reliability determining unit 108 in cooperation. Through these processes, the disparity value and the reliability thereof are assigned to each of 1 to n small segments.

First, the reference point determining unit 105 selects one of the small segments (S103). Next, the reference point determining unit 105 determines a reference point in a selected small segment (hereinafter, a selected segment) (S104). Next, the corresponding point detecting unit 106 calculates the disparity value and the reliability thereof related to the determined reference point (S105).

Figure 4:
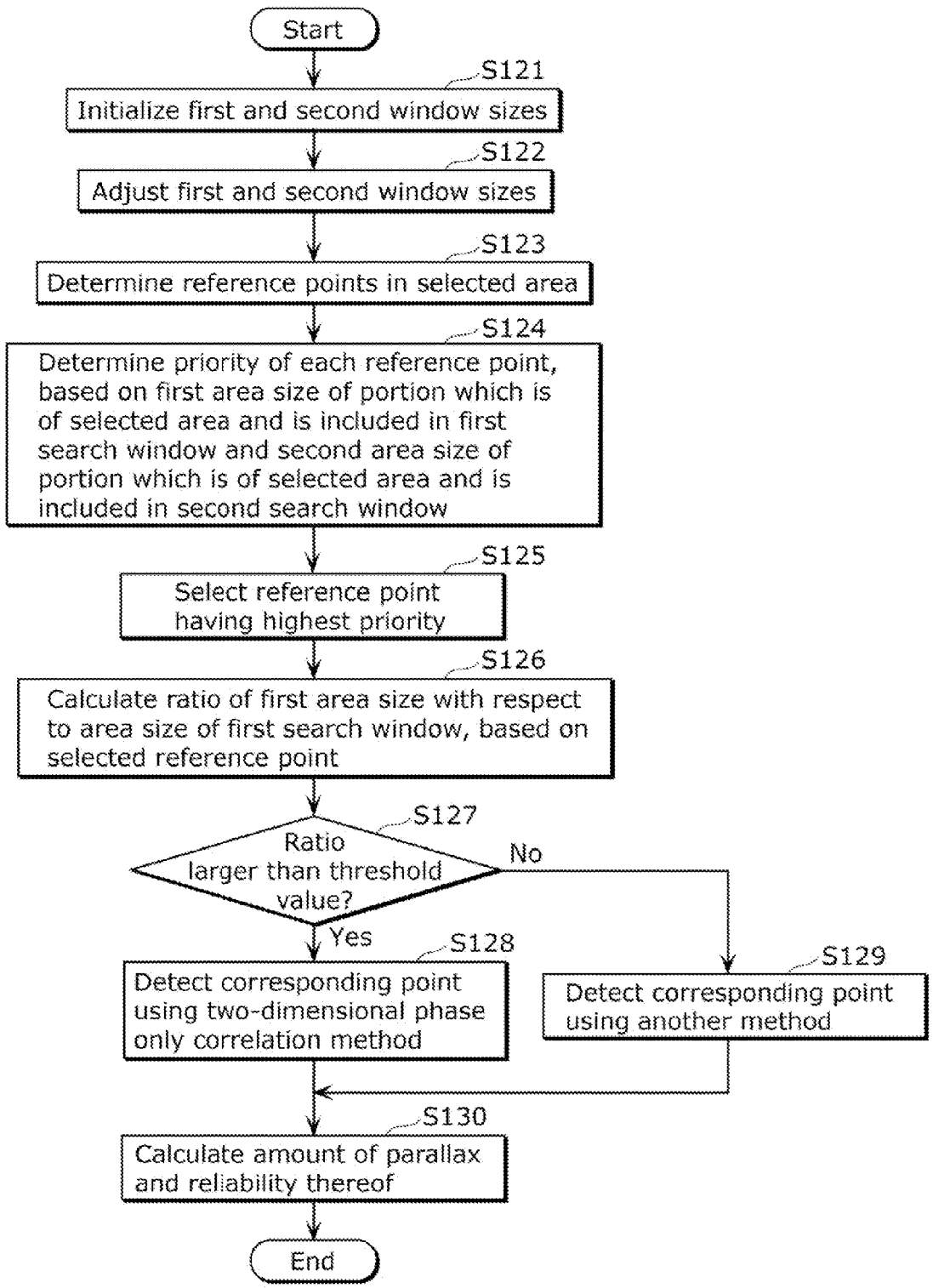
FIG. 4 is a flowchart of corresponding point calculation processes according to Embodiment 1.

FIG. 4 is a detailed flowchart of these Steps S104 and S105.

First, the reference point determining unit 105 stores a first window size and a second window size, and initializes the first window size and the second window size when starting the processes performed on a small segment basis (S121). Here, the first window size (a first size) and the second window sizes (a second size) are sizes of a first search window (a first surrounding segment) and a second search window (a second surrounding segment) which are described later. In addition, the first search window is, for example, equal to the sizes (search window sizes) of the search windows (the first segment and the second segment) used when the corresponding point detecting unit 106 described later calculates phase information. It is to be noted that the first search window may vary in size from the search window used when the corresponding point detecting unit 106 described later calculates the phase information.

More specifically, the reference point determining unit 105 sets the first window size to a size larger than or equal to a minimum size Ws0 for an segment (a search window) used when the corresponding point detecting unit 106 calculates the corresponding point based on the phase information of images already subjected to Fourier transform, and sets the second window size to a size exceeding the first window size. For example, the second window is twice the size of the first window size. Here, the minimum size Ws0 is a window size below which the reliability of the disparity value decreases significantly.

Next, the reference point determining unit 105 adjusts the first and second window size (S122). More specifically, the reference point determining unit 105 checks whether or not the first window size is equal to Ws0. When the first window size is equal to Ws0, the reference point determining unit 105 cannot reduce the first window size any further, and thus determines the first window size as Ws0. On the other hand, when the first window size is not equal to Ws0, the reference point determining unit 105 compares the width of the selected segment and the width of the first window size, and when the first window size is larger, reduces the first window size. For example, the reference point determining unit 105 reduces the first window size such that the whole first search window is included in the selected segment. At this time, the reference point determining unit 105 reduces the first window size so as not to be smaller than Ws0. In addition, the reference point determining unit 105 adjusts the second window size to the reduced first window size as necessary.

Next, the reference point determining unit 105 selects a plurality of reference point candidates (S123). For example, the reference point determining unit 105 assigns the plurality of reference points at random or arranges the plurality of reference points apart from each other by a certain distance so that the plurality of reference points are dominant in a particular segment within the selected segment.

Figure 5:
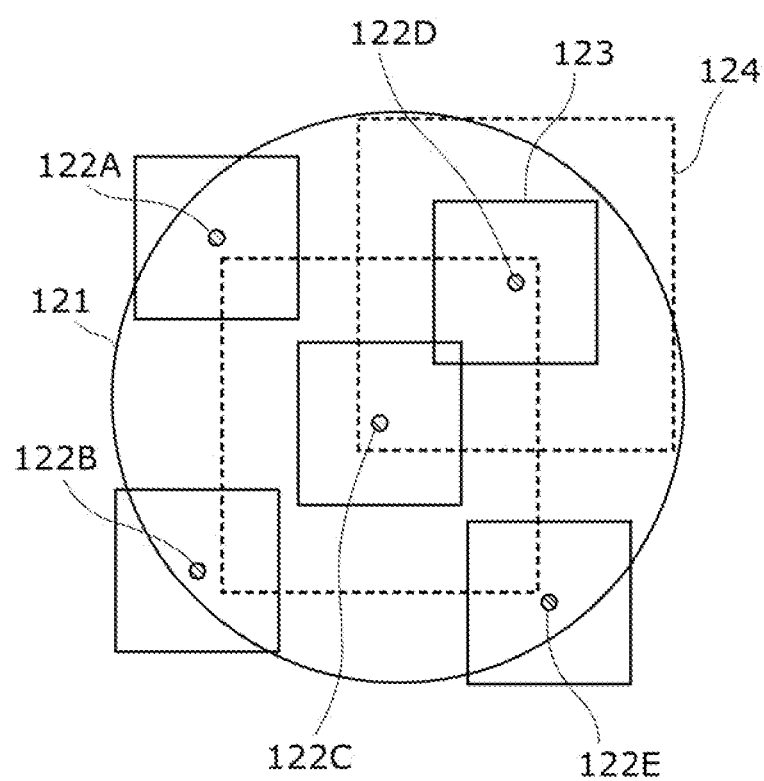
FIG. 5 is an illustration of examples of reference points and search windows according to Embodiment 1.

Next, the reference point determining unit 105 determines priorities (order of priority) for the respective reference candidates (S124). FIG. 5 is a diagram for illustrating this process. As shown in FIG. 5, the reference point determining unit 105 sets the plurality of reference point candidates 122A to 122E in the selected segment 121.

Next, the reference point determining unit 105 determines, for each of the reference point candidates, the first search window 123 having a center which is the reference point candidate and having a first window size and the second search window 124 having a center which is the reference point candidate and having a second window size larger than the first window size. Next, the reference point determining unit 105 calculates, for the reference point candidate, a first segment size of a portion which is of the selected segment 121 and is included in the first search window 123. In addition, the reference point determining unit 105 calculates, for the reference point candidate, a second segment size of a portion which is of the selected segment 121 and is included in the second search window 124.

Next, the reference point determining unit 105 arranges all of the reference point candidates in descending order of sizes of the first segment size. When two or more of the reference point candidates have the same segment size, the reference point determining unit 105 determines the priorities of the two or more reference point candidates in descending order of the second segment sizes, and thereby determines the priorities of all the reference point candidates. In other words, the reference point determining unit 105 sets the priorities of the reference point candidates such that a reference point candidate having a larger first segment size has a higher priority, and that, when two or more of the reference point candidates have the same first segment size, the reference point candidate having a larger or largest second segment size has a higher or highest priority.

Next, the reference point determining unit 105 determines a reference point from the reference point candidates, based on the priorities thereof. More specifically, the reference point determining unit 105 sets the reference point candidate having the highest priority as the reference point (S125).

For example, in the example shown in FIG. 5, the reference point candidates 122C and 122D have the largest first segment size among the reference point candidates 122A to 122E. In addition, the second segment size of the reference point candidate 122C is larger than the second segment size of the reference point candidate 122D. Thus, the reference point determining unit 105 determines the reference point candidate 122C as the reference point to be used in subsequent processes.

Next, the reference point determining unit 105 compares the first segment size of the segment including the reference point candidate having the highest priority with the segment size of the first search window, and calculates the ratio of the first segment size with respect to the segment size of the first search window (S126). Next, the reference point determining unit 105 compares the calculated ratio with a predetermined threshold value (S127). When the calculated ratio is larger than the threshold value (Yes in S127), the reference point determining unit 105 decides to detect the corresponding point for the selected segment using a two-dimensional POC method (POC), and specifies the method for the corresponding point detecting unit 106. Here, POC is a scheme for calculating a corresponding point based on phase information of Fourier transform images.

On the other hand, when the calculated ratio is smaller than the threshold value (No on S127), the reference point determining unit 105 decides to detect the corresponding point for the selected segment using a method other than the two-dimensional POC method (POC), and specifies the method for the corresponding point detecting unit 106.

According to the specification from the reference point determining unit 105, the corresponding point detecting unit 106 calculates, for the given reference point, the reference point in the other image (the second image) in the stereo image using the POC or the other method (5128 or 5129). Here, the other method is a block matching method (BM) such as SSD and SAD.

More specifically when the use of the POC is specified, the corresponding point detecting unit 106 generates a first transform image by performing Fourier transform on the first search window (the first segment) having the reference point and having the first window size in the first image. In addition, the corresponding point detecting unit 106 generates second transform images by performing Fourier transform on third search windows (the second segments) having the first window size in the second images. Here, each of the third search windows is an segment having a center which is one of the corresponding point candidates and having the first window size. Next, the corresponding point detecting unit 106 calculates the correlation between the first transform image and each of the second transform images. Next, the corresponding point detecting unit 106 selects one of the second transform images which has the highest correlation with the first transform image, and determines the corresponding point candidate which is the center of the third search window corresponding to the selected image as the corresponding point for the reference point in the first image.

Next, the corresponding point detecting unit 106 calculates the disparity value from the difference between the reference point and the corresponding point, and calculates the reliability of the disparity value at the same time (S130). For example, the corresponding point detecting unit 106 calculates, as the reliability, the height of the correlation peak of the phase information when the POC is used. In addition, the corresponding point detecting unit 106 calculates, as the reliability, (a peak constant—an evaluation value) when the SSD is used. Here, the peak constant is a predetermined fixed value. The evaluation value is an evaluation value in the SSD, and a smaller evaluation value shows a higher evaluation. More specifically, the evaluation value is a square of the difference between the two images in matching. In addition, when (a peak constant—an evaluation value) yields a negative value, the evaluation value is set to 0 (the smallest value).

A description is given below using FIG. 3 again.

After Step S105, the disparity assigning unit 107 assigns the disparity value and the reliability thereof calculated by the corresponding point detecting unit 106 to the whole selected segment (S106). In other words, the disparity value and the reliability thereof calculated using the one of the reference points in the selected segment are set as the disparity value and the reliability thereof for the whole selected segment.

Next, the reliability determining unit 108 compares the reliability assigned to the selected segment by the disparity assigning unit 107 with a threshold value, and thereby determines whether or not the reliability is higher than the threshold value (S107). When the reliability is higher than the threshold value (Yes in S107), the reliability determining unit 108 determines the assigned values as the disparity value and the reliability thereof for the selected segment. When the above-described processes have not yet performed on the small segments (No in S109), a next one of the at least one segment is selected (S103), and Step S104 and the subsequent processes are performed on the newly selected segment.

On the other hand, when the assigned reliability is lower than the threshold value (No in S107), the reliability determining unit 108 gives one of the reference point determining unit 105, the corresponding point detecting unit 106, and the disparity assigning unit 107 an instruction for causing calculation, based on a modified condition, of the disparity value using the reference point and the corresponding point and the reliability thereof. More specifically, the reference point determining unit 105 sets a new reference point selected from among the reference point candidates, based on the priorities of the reference point candidates.

For example, the reference point determining unit 105 determines, as the new reference point, the reference point candidate having the second-highest priority (S108). More specifically, the reference point determining unit 105 calculates the ratio of the first segment size of the reference point candidate having the second-highest priority with respect to the first segment size of the reference point candidate having the highest priority. In the case where the ratio is larger than the threshold value, the reference point determining unit 105 determines, as the new reference point, the reference point candidate having the second-highest priority. This new reference point is used when Steps S105 and the subsequent processes are performed. In the other case where the ratio is smaller than the threshold value, any additional calculation yields an increased reliability. Thus, the reliability determining unit 108 determines the disparity value and the reliability thereof for the selected segment as they are.

In addition, when the processes of S103 to S108 are performed on the respective 1 to n small segments (Yes in S109), the results are output to the disparity interpolating unit 109.

The disparity interpolating unit 109 modifies the one or more disparity values and the one or more reliabilities thereof lower than the threshold value among the resulting disparity values and the reliabilities thereof calculated for the small segments (S110). More specifically, the disparity interpolating unit 109 searches for surrounding small segments for each of the one or more small segments having a reliability lower than the threshold value. The disparity interpolating unit 109 checks the reliabilities of the surrounding small segments in ascending order of distances from the target small segment. When detecting a small segment having a reliability higher than or equal to the threshold value, the disparity interpolating unit 109 assigns the target small segment having a lower reliability the disparity value and the reliability thereof related to the small segment.

The method of assigning the disparity value and the reliability thereof to each of one or more small segments having a low reliability may be another possible method. For example, the disparity interpolating unit 109 may check the reliabilities of the surrounding small segments, and may perform weighted sum of the disparity values of surrounding small segments having a reliability higher than a threshold value among the surrounding small segments based on the distances from the target small segment, and thereby calculates the disparity value and the reliability thereof related to a small segment having a low reliability.

In this way, the disparity calculating apparatus 100 extracts the edge shapes and divides the image into the plurality of small segments in the image dividing process. Next, the disparity calculating apparatus 100 calculates the disparity value for each small segment. In this way, the disparity calculating apparatus 100 can calculate the disparity value with high accuracy and with the maintained edge shapes. Furthermore, the disparity calculating apparatus 100 can calculate the disparity value with high accuracy using the POC in the corresponding point calculating processes. In addition, the disparity calculating apparatus 100 calculates the disparity value based on a representative point (the reference point) included in the small segment, and assigns the calculated disparity value as the disparity value for the whole small segment. In this way, the disparity calculating apparatus 100 can reduce the amount of calculation.

Furthermore, the disparity calculating apparatus 100 can calculate disparity having a higher reliability for each of small segments utilizing a feedback etc. from the reliability determining unit 108. In addition, the disparity calculating apparatus 100 can calculate disparity with high accuracy because the disparity interpolating unit 109 can replace disparity having a low reliability of the small segment with disparity having a high reliability obtained based on disparity having a high reliability of a surrounding small segment.

In the above description, the image input unit 103 obtains the stereo image from the left and right cameras. However, the image input unit 103 may obtain a stereo image from a recording medium such as a Blu-ray disc, or may obtain a stereo image via a network. In this embodiment, the disparity calculating apparatus 100 performs the processes on the stereo image composed of the two images. However, the disparity calculating apparatus 100 may obtain a multi-view image including three or more images captured by cameras, and may perform such processes using two images selected from among the three or more images.

In the above description, the image dividing unit 104 performs the small segment combination regarding the small segments as targets. However, the image dividing unit 104 may perform such combining processes only on necessary parts based on the results of determination made by the reference point determining unit 105. When the first segment size of the processing-target small segment with respect to the segment size of the first search window is smaller than the predetermined value, the reference point determining unit 105 may combine the processing-target segment and some of the neighboring small segments which have color information similar to the color information of the processing-target segment and may determine a reference point for the segment obtained by the combination.

In addition, in the description, the reference point determining unit 105 adjusts the first window sizes (S122 in FIG. 4). However, the reference point determining unit 105 may initialize the first window size to the minimum size Ws0 in Step S121, and may omit Step S122.

In the above description, the reference point determining unit 105 selects the reference point having the highest priority from among the plurality of reference points (S125), and then calculates the ratio of the first segment size with respect to the segment size of the first search window (S126). However, the reference point determining unit 105 may compare the size of the selected segment and the first window size at the stage (S122) of adjusting the first window size, and, when the first window size is larger, decide to calculate the corresponding point using the method other than the POC.

Embodiment 2

This embodiment relates to a modified example of the disparity calculating apparatus 100 according to Embodiment 1 described above. A disparity calculating apparatus 200 according to this embodiment calculates the disparity value and the reliability thereof corresponding to each of a plurality of reference points in each of small segments, and assigns a selected segment the disparity value having the highest reliability.

Figure 6:
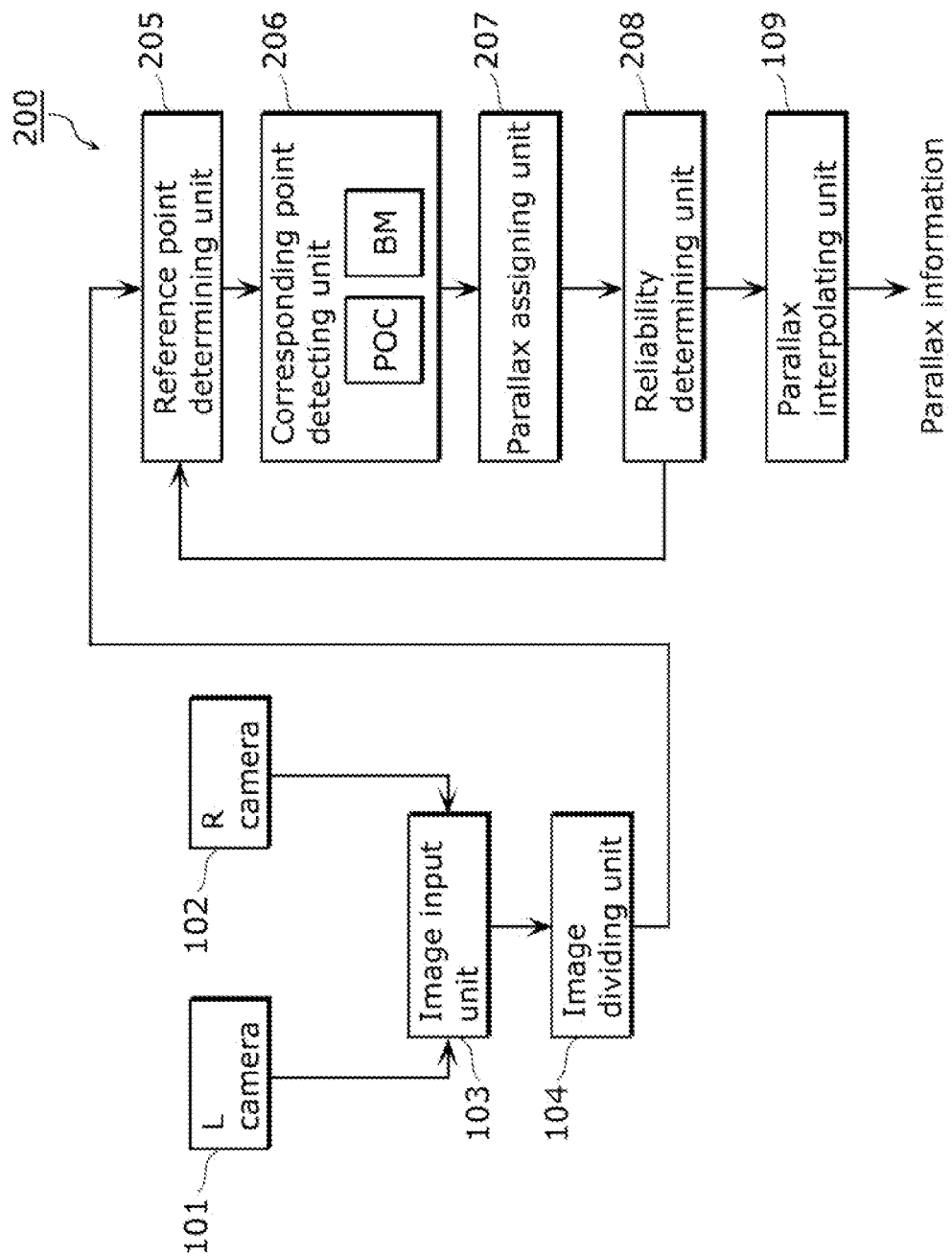
FIG. 6 is a block diagram of a disparity calculating apparatus according to Embodiment 2.

FIG. 6 is a block diagram of the disparity calculating apparatus 200 according to this embodiment. The same structural elements as in FIG. 2 are assigned with the same reference numerals and are not described here. In addition, FIG. 7 is a flowchart of disparity value calculating processes performed by the disparity calculating apparatus 200.

The disparity calculating apparatus 200 shown in FIG. 6 includes a reference point determining unit 205, a corresponding point detecting unit 206, a disparity assigning unit 207, and a reliability determining unit 208 having functions different from those of the equivalents in the structure shown in FIG. 2.

Figure 7:
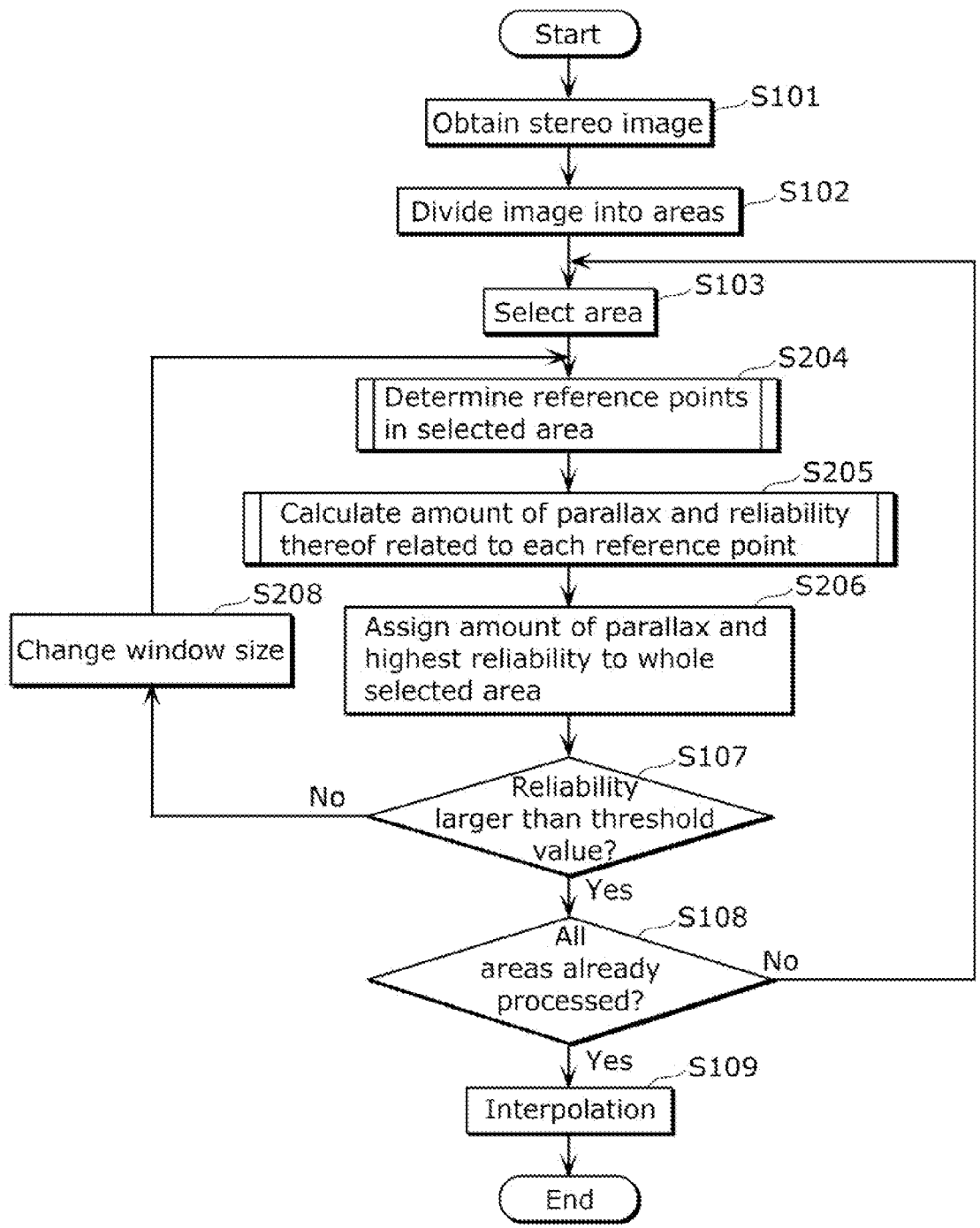
FIG. 7 is a flowchart of disparity calculation processes according to Embodiment 2.

As shown in FIG. 7, the reference point determining unit 205 determines the plurality of reference points for the selected segment (S204). Next, the corresponding point detecting unit 206 calculates the disparity value and the reliability thereof for each of the reference points (S205).

Figure 8:
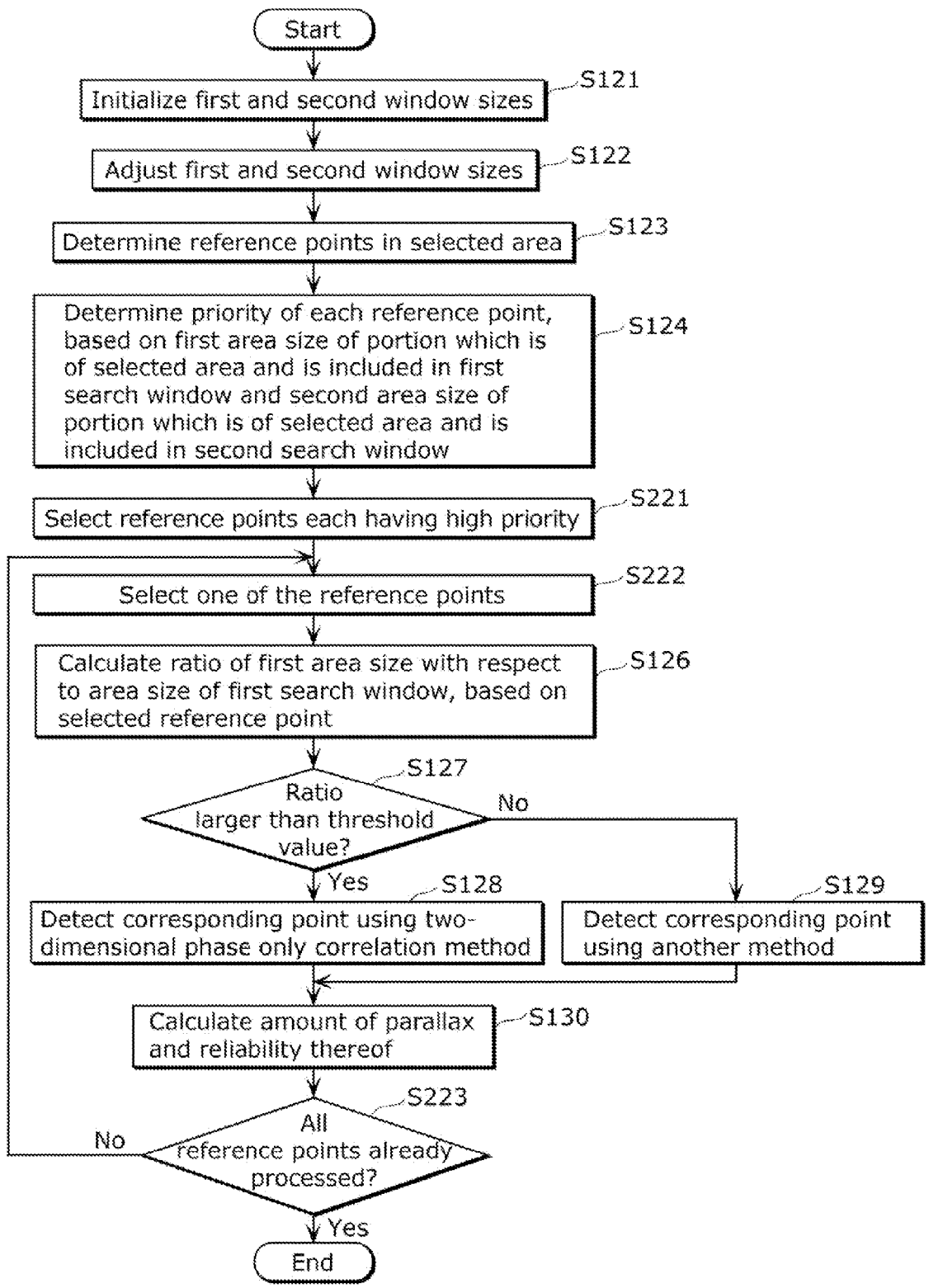
FIG. 8 is a flowchart of corresponding point calculation processes according to Embodiment 2.

FIG. 8 is a flowchart of detailed processes of Steps S204 and S205. It is to be noted that Steps S121 to S124 are the same as in Embodiment 1.

The reference point determining unit 205 selects two or more of the plurality of reference point candidates based on the priorities determined in S124. More specifically, the reference point determining unit 205 selects the two or more reference point candidates in descending order of priorities (S221). Next, the corresponding point detecting unit 206 selects one of the two or more reference point candidates (S222). The corresponding point detecting unit 206 calculates a corresponding point for each of the selected candidates using POC or MB, and calculates the disparity value and the reliability thereof using the corresponding point obtained as a result of the calculation (S126 to S139). It is to be noted that these processes are the same as in Embodiment 1. In addition, these sequential processes are executed on all of the reference point candidates (S223). Through these processes, a plurality of combinations of the disparity values and reliabilities are calculated for each of the plurality of reference points.

A description is given below using FIG. 7 again.

The disparity assigning unit 207 selects a combination having the highest reliability from among the combinations of the disparity values and reliabilities thereof calculated by the corresponding point detecting unit 206 (S206).

The reliability determining unit 208 compares the reliability assigned to the selected segment by the disparity assigning unit 207 with a threshold value, and thereby determines whether or not the reliability is higher than the threshold value (S107). When the reliability is higher than the threshold value (Yes in S107), the reliability determining unit 208 determines the assigned values as the disparity value and the reliability thereof for the selected segment.

On the other hand, when the reliability is lower than the threshold value (No in S107), the reference point determining unit 205 increases a first window size in order to detect a corresponding point in a wider range (S208), determines the priorities of the respective reference points (S124), and performs the processes in S221 and the subsequent steps.

As described above, when the reliability obtained by the corresponding point detecting unit 206 is lower, the disparity calculating apparatus 200 performs the processes starting with the determination of the reference points using the wider first window size, and can thereby execute the process of detecting the corresponding point in the wider range. In this way, the disparity calculating apparatus 200 can increase the reliability.

In the example given here, the first window size is adjusted when the reliability is low. However, when it is expected that the disparity value having a high reliability cannot be obtained when the reference point determining unit 105 or 205 determines reference points, it is possible to adjust a first window size and determine new reference points. For example, the reference point determining unit 105 or 205 adjusts the first window size and determines the new reference points when the ratio of a first segment size with respect to the segment size of the first search window is smaller than a threshold value.

Embodiment 3

This embodiment relates to a modified example of the disparity calculating apparatus 200 according to Embodiment 2 described above. When the reliability of the disparity value related to a selected segment is low, a disparity calculating apparatus according to this embodiment calculates the disparity value to be assigned to the selected segment, based on the disparity values related to the selected segment.

Figure 9:
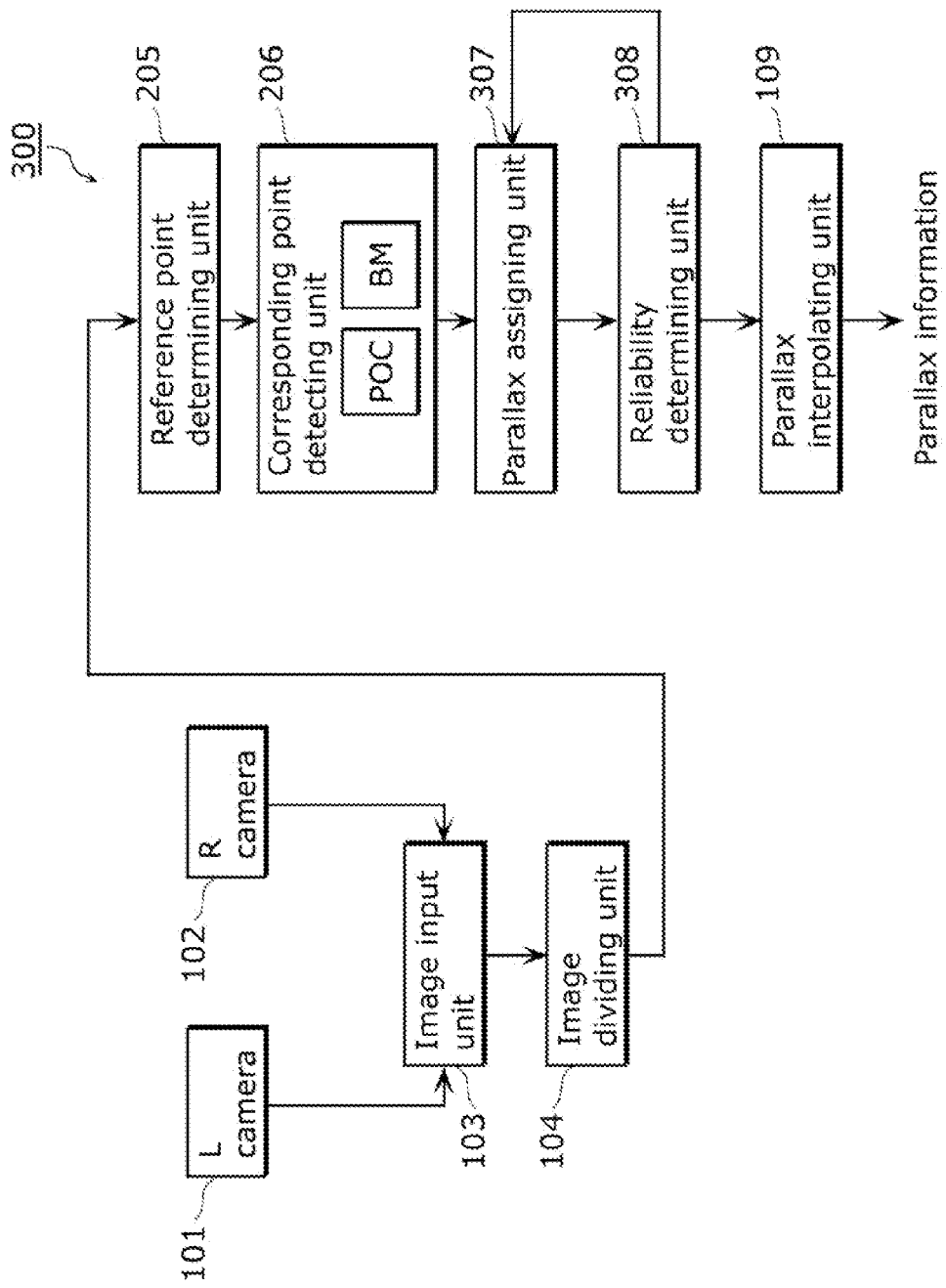
FIG. 9 is a block diagram of a disparity calculating apparatus according to Embodiment 3.

FIG. 9 is a block diagram of the disparity calculating apparatus 300 according to this embodiment. In FIG. 9, the same structural elements as in FIG. 6 are assigned with the same reference numerals and are not described here. In addition, FIG. 10 is a flowchart of disparity value calculating processes performed by the disparity calculating apparatus 300.

The disparity calculating apparatus 300 shown in FIG. 9 includes a disparity assigning unit 307 and a reliability determining unit 308 having functions different from those of the equivalents in the structure shown in FIG. 6. In the normal processing, the disparity assigning unit 307 selects, a combination having the highest priority from among a plurality of combinations of the disparity values and reliabilities thereof obtained by a corresponding point detecting unit 206, and assigns the whole selected segment the disparity value and the reliability thereof included in the selected combination.

Figure 10:
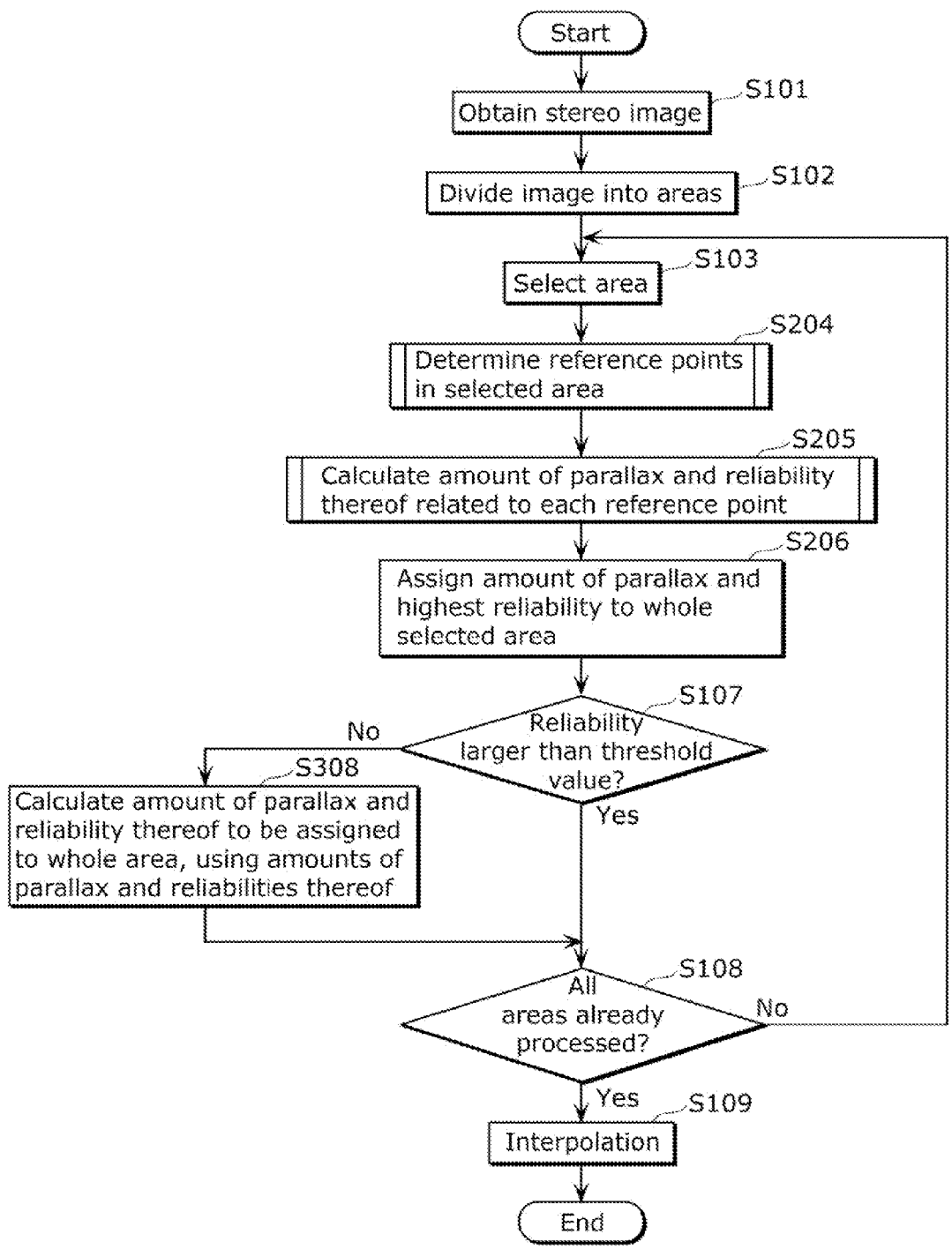
FIG. 10 is a flowchart of disparity calculation processes according to Embodiment 3.

In addition, when the reliability is lower than a threshold value as shown in FIG. 10 (No in S107), the disparity assigning unit 307 calculates the disparity value and the reliability thereof to be assigned to the selected segment using the disparity values and the reliabilities thereof, and assigns the calculated disparity value and reliability to the selected segment (S308).

More specifically, the disparity assigning unit 307 selects two or more combinations each including a reliability higher than or equal to the threshold value from among the plurality of combinations of the disparity values and reliabilities thereof, and calculates the disparity value and the reliability thereof to be assigned to the selected segment, based on the disparity values and the reliabilities thereof included in the selected combinations. More specifically, the disparity assigning unit 307 performs linear weighted sum of the disparity values using, as weighted coefficients, the results each obtained from (the reliability x the second segment size ÷ the second search window size) to obtain the disparity value to be assigned to the selected segment. In other words, the disparity assigning unit 307 performs weighted sum of the disparity values included in the combinations (the disparity values and the reliabilities thereof) calculated for the selected segment, based on the ratio of the second segment size with respect to the segment size of the second selection window and the reliabilities, so as to newly obtain the disparity value and reliability thereof.

In addition, the disparity assigning unit 307 calculates the average value of the reliabilities included in the selected combinations, as the reliability to be assigned to the selected segment.

The reliability determining unit 308 compares the reliability assigned by the disparity assigning unit 307 with the threshold value, and thereby determines whether or not the reliability is higher than the threshold value (S107). When the reliability is higher than the threshold value (Yes in S107), the reliability determining unit 308 determines the assigned values as the disparity value and the reliability thereof for the selected segment. On the other hand, when the reliability is lower than the threshold value (No in S107), the reliability determining unit 308 gives the disparity assigning unit 307 an instruction for performing a process of calculating the disparity value and the reliability thereof using the disparity values and the reliabilities thereof (S308).

As described above, when the reliability is low, the disparity calculating apparatus 300 calculates the disparity value and the reliability thereof based on the disparity values and the reliabilities thereof. In this way, when the reference point having a high priority is finally found to have a low reliability, the disparity calculating apparatus 300 newly calculates the disparity value, using the reference point having a high reliability even though the reference point has a low priority. In this way, the disparity calculating apparatus 300 can obtain the disparity having the high reliability.

The disparity assigning unit 307 uses, as the weighted coefficients, the results each obtained from (the reliability x the second segment size the second search window size) in the above description, but the disparity assigning unit 307 may use the reliability only as the weighted coefficient. In other words, the disparity assigning unit 307 may perform weighted sum of the disparity values included in the combinations (the disparity values and the reliabilities thereof) calculated for the selected segment, based on the reliabilities thereof, to newly obtain the disparity value and the reliability thereof.

Embodiment 4

This embodiment relates to a modified example of the disparity calculating apparatus 300 according to Embodiment 3 described above. A disparity calculating apparatus according to this embodiment uses a one-dimensional POC instead of a two-dimensional POC.

Figure 11:
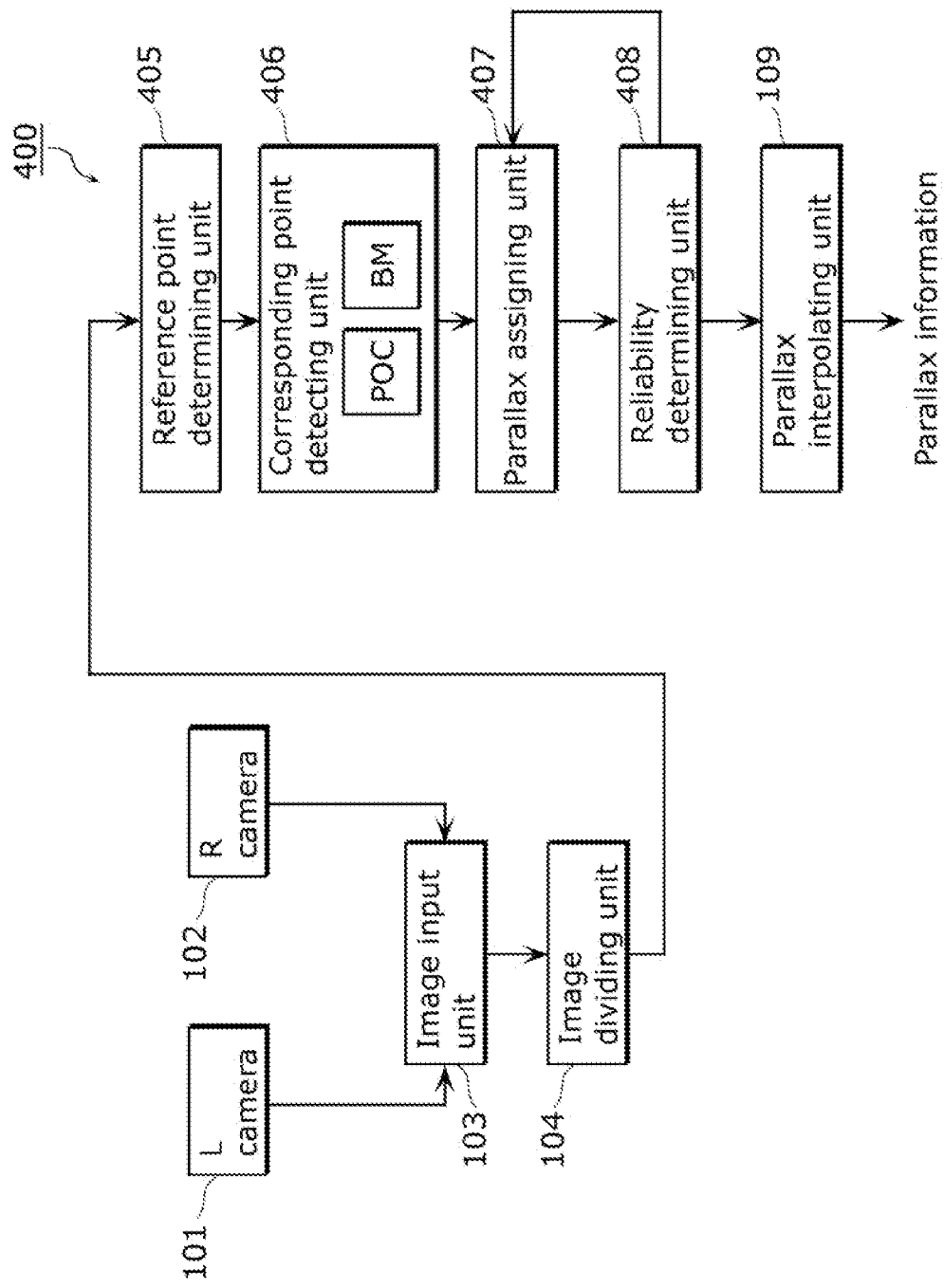
FIG. 11 is a block diagram of a disparity calculating apparatus according to Embodiment 4.
Figure 12:
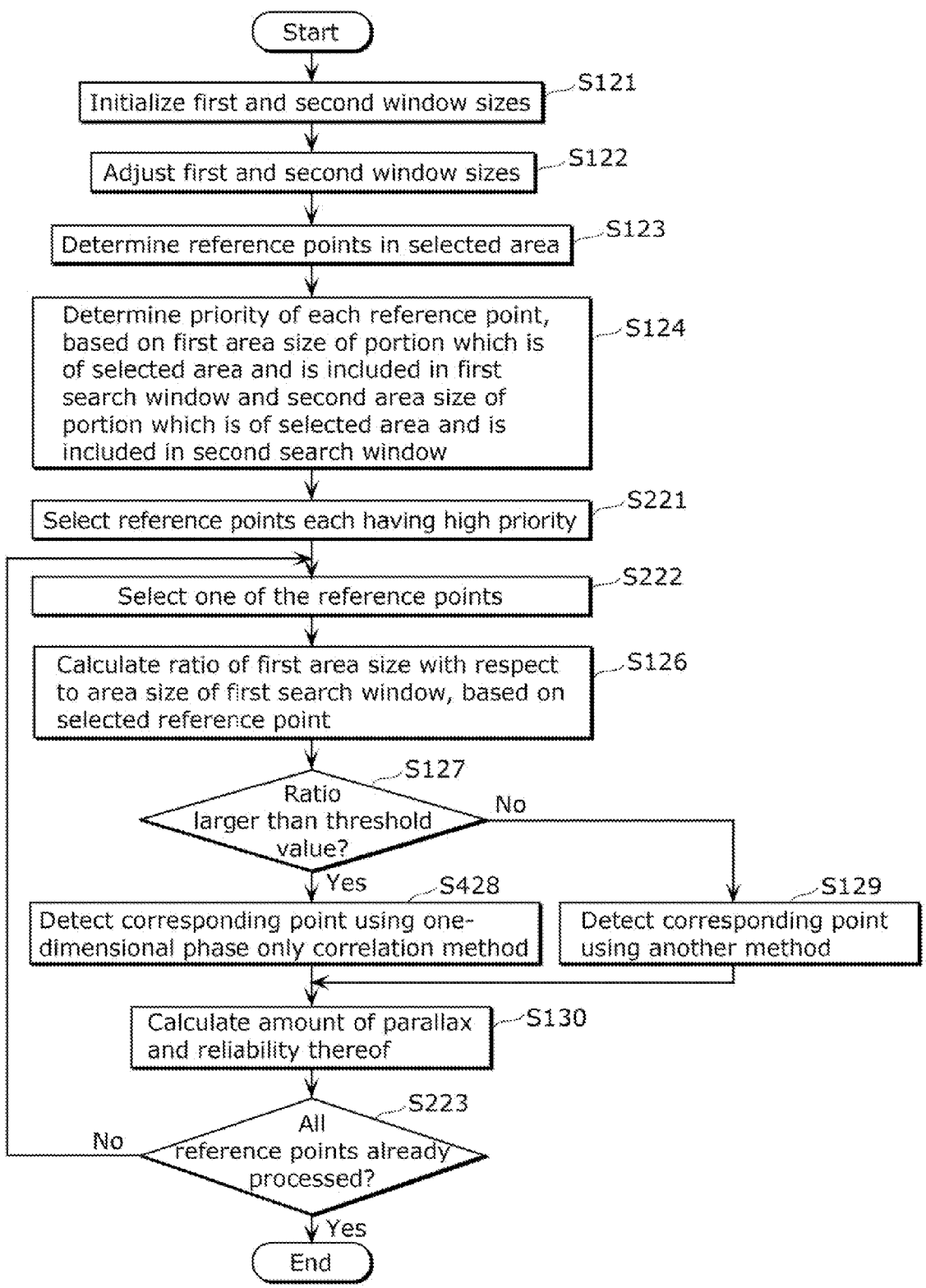
FIG. 12 is a flowchart of corresponding point calculation processes according to Embodiment 4.

FIG. 11 is a block diagram of the disparity calculating apparatus 400 according to this embodiment. In FIG. 11, the same structural elements as in FIG. 9 are assigned with the same reference numerals and are not described here. In addition, FIG. 12 is a flowchart of processes for detecting a corresponding point performed by the disparity calculating apparatus 300 (Steps S204 and S205 in FIG. 10). It is to be noted that the overall flow of the disparity value calculating processes performed by the disparity calculating apparatus 300 is the same as in FIG. 10.

The disparity calculating apparatus 400 shown in FIG. 11 includes a reference point determining unit 405, a corresponding point detecting unit 406, a disparity assigning unit 407, and a reliability determining unit 408 having functions different from those of the equivalents in the structure shown in FIG. 9.

The reference point determining unit 405 performs operations basically similar to operations performed by the reference point determining unit 205 shown in FIG. 9 other than only an operation of setting the vertical size of a first window size to 1 when initially setting the size of the first window size in Step S121 shown in FIG. 12 and thereby setting the first search window as a one-dimensional window.

In addition, when the ratio calculated in Step S127 is larger than a threshold value (Yes in S127), the corresponding point detecting unit 406 calculates, for a given reference point, a corresponding point on the other image in the stereo image, using the method (one-dimensional POC) based on phase information of one-dimensional images already subjected to Fourier transform, according to specification from the reference point determining unit 405 (S428). In addition, the corresponding point detecting unit 406 calculates the disparity value which is the difference between the reference point and the corresponding point, and calculates the reliability of the disparity value at the same time (S130). For example, the corresponding point detecting unit 406 calculates, as the reliability, the height of the correlation peak of the phase information when the one-dimensional POC is used.

In the normal processing, the disparity assigning unit 407 selects, a combination having the highest priority from among a plurality of combinations of the disparity values and reliabilities thereof obtained by the corresponding point detecting unit 406, and assigns the disparity value and the reliability thereof in the selected combination to the whole selected segment.

In addition, when the reliability of the disparity value related to a selected segment is lower than a threshold value as shown in FIG. 10 (No in S107), the disparity assigning unit 407 calculates the disparity value and the reliability thereof to be assigned to the selected segment, based on the disparity values and the reliabilities thereof related to the selected segment, and assigns the calculated disparity value and reliability to the selected segment. More specifically, the disparity assigning unit 407 newly calculates the disparity value and the reliability thereof, based on the disparity values and the reliabilities thereof related to reference points neighboring the reference point having the highest priority. More specifically, the disparity assigning unit 407 newly calculates the disparity value by calculating a linear weighted sum of the disparity values related to the neighboring reference points, based on the reliabilities thereof. In addition, the disparity assigning unit 407 calculates, as the new reliability, the average value of the reliabilities related to the neighboring reference points.

The reliability determining unit 408 compares the reliability assigned by the disparity assigning unit 407 with the threshold value, and thereby determines whether or not the reliability is higher than the threshold value (S107). When the reliability is higher than the threshold value (Yes in S107), the reliability determining unit 408 determines the assigned values as the disparity value and the reliability thereof for the selected segment. On the other hand, when the reliability is lower than the threshold value (No in S107), the reliability determining unit 408 gives the disparity assigning unit 407 an instruction for performing a process of calculating the disparity value and the reliability thereof, based on the disparity values and the reliabilities thereof (S308).

As described above, when the reliability is lower, the disparity calculating apparatus 400 calculates the disparity value and the reliability thereof, utilizing the calculation results obtained for the reference points neighboring the reference point. In this way, the disparity calculating apparatus 400 can obtain the disparity having the high reliability when the one-dimensional POC is used.

Embodiment 5

This embodiment relates to a modified example of the disparity calculating apparatus 200 according to Embodiment 2 described above. When there are three or more reference points having a high reliability, a disparity calculating apparatus according to this embodiment calculates a distribution of the disparity values related to a current small segment, based on the disparity values related to these reference points, and assigns the calculation result to the current small segment.

Figure 13:
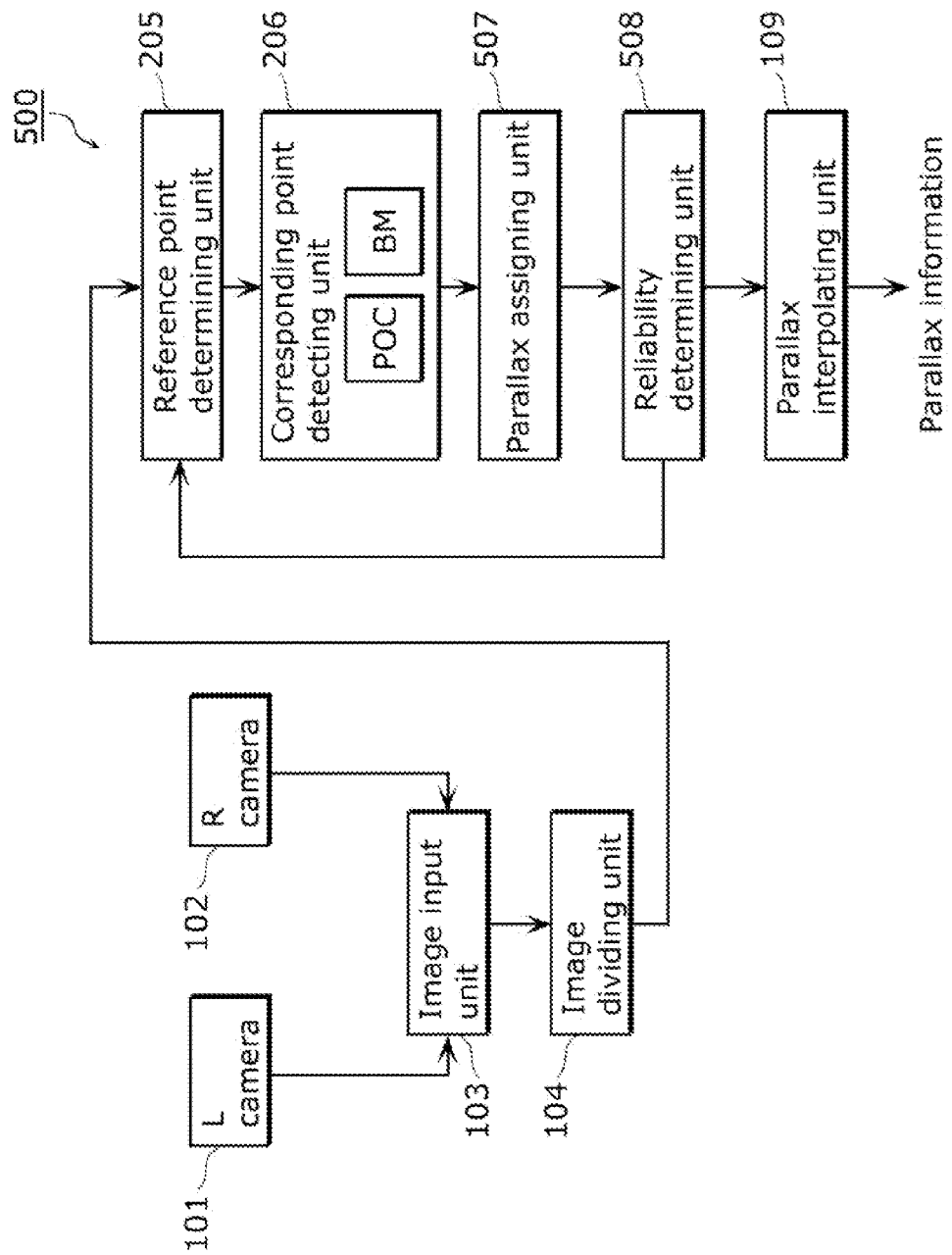
FIG. 13 is a block diagram of a disparity calculating apparatus according to Embodiment 5.
Figure 14:
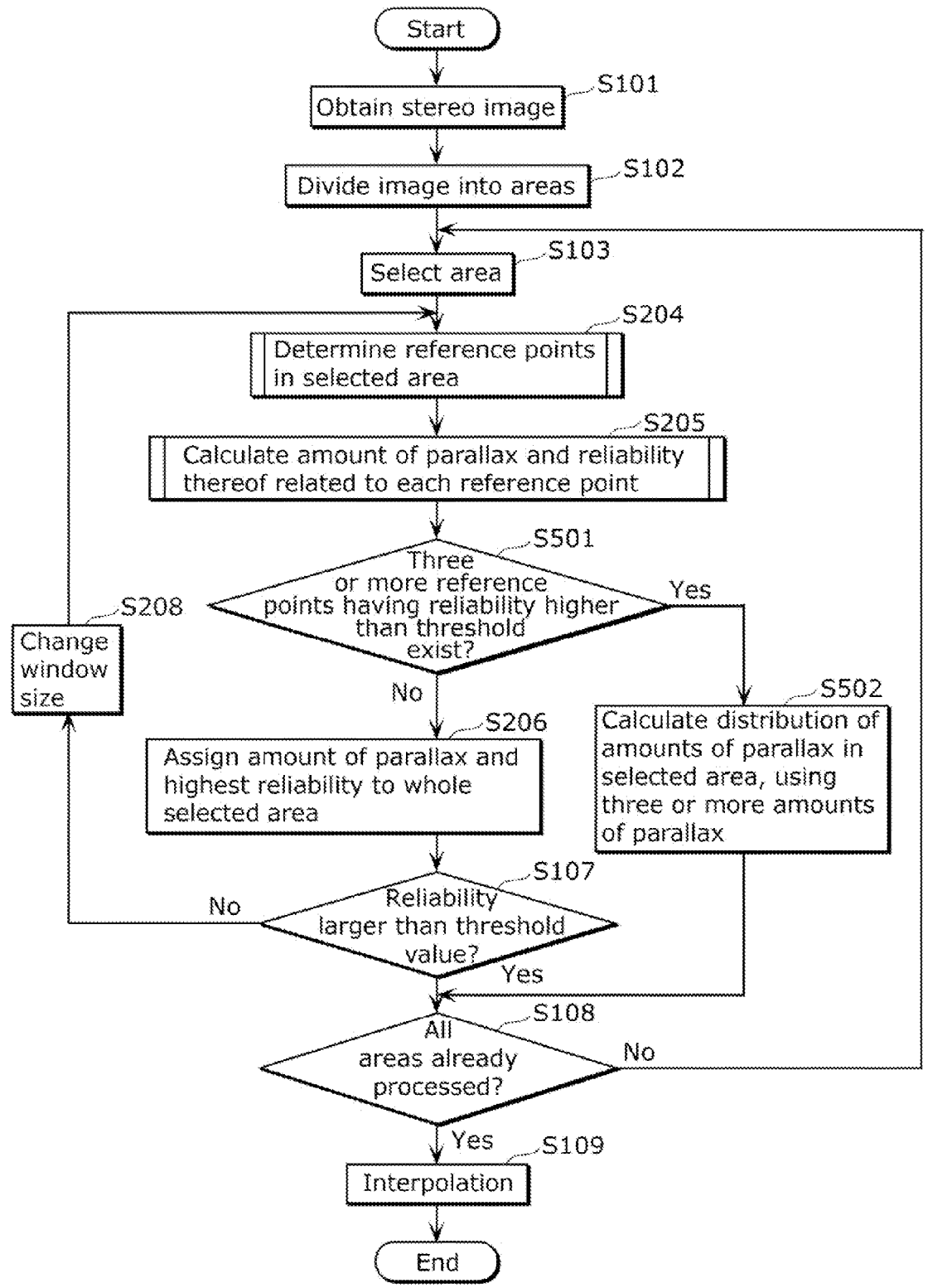
FIG. 14 is a flowchart of disparity calculation processes according to Embodiment 5.

FIG. 13 is a block diagram of the disparity calculating apparatus 500 according to this embodiment. In FIG. 13, the same structural elements as in FIG. 6 are assigned with the same reference numerals and are not described here. In addition, FIG. 14 is a flowchart of disparity value calculating processes performed by the disparity calculating apparatus 500.

The disparity calculating apparatus 500 shown in FIG. 13 includes a disparity assigning unit 507 and a reliability determining unit 508 having functions different from those of the equivalents in the structure shown in FIG. 6.

The disparity assigning unit 507 determines whether or not at least three reference points having a reliability higher than a threshold value are included in combinations of the disparity values and the reliabilities thereof calculated by the corresponding point detecting unit 206 (S501). When three or more reference points having a reliability higher than the threshold value are present (Yes in S501), the disparity assigning unit 507 calculates a three-dimensional plane composed of X and Y coordinates and the disparity values Z on an image and presenting a two-dimensional distribution of the disparity values, and assigns the calculation result to the whole selected segment (S502). The disparity calculation apparatus 500 processes a next small segment.

For example, assuming that the disparity gradually changes, the disparity assigning unit 507 models the three-dimensional distribution composed of the X and Y coordinates and the disparity values Z in the image into a plane, and calculates an equation for the plane. The disparity assigning unit 507 can assign the whole segment the disparity distribution according to the equation. It is to be noted that the disparity assigning unit 507 may obtain an equation by modeling the three-dimensional distribution into a spline curve or a Bézier curve and use the equation.

On the other hand, when the number of reference points having a reliability higher than the threshold value is 2 or less (No in S501), the disparity assigning unit 507 selects the combination having the highest reliability and assigns the disparity value and the reliability thereof in the selected combination to the whole selected segment (S206).

When the number of reference points having a reliability higher than the threshold value is 2 or less, the reliability determining unit 508 compares the reliability assigned by the disparity assigning unit 507 with the threshold value, and thereby determines whether or not the reliability is higher than the threshold value (S107). It is to be noted that these processes are the same as in Embodiment 2.

As described above, the disparity calculating apparatus 500 calculates a two-dimensional distribution of the disparity values within the selected segment, and assigns the calculation result to the selected segment. This prevents the disparity values from being planar, and thus can achieve the disparity distribution having a more realistic shape.

Embodiment 6

In the above embodiments, one or more reference points are determined for each small segment. A disparity calculating apparatus according to this embodiment determines a plurality of reference points for an image which has not yet been divided into segments, and calculates a plurality of combinations of the disparity values and the reliabilities thereof related to the determined reference points. Next, the disparity calculating apparatus selects one of at least one combination of the disparity value and the reliability thereof which is included in a selected segment and is to be assigned to the selected segment.

Figure 15:
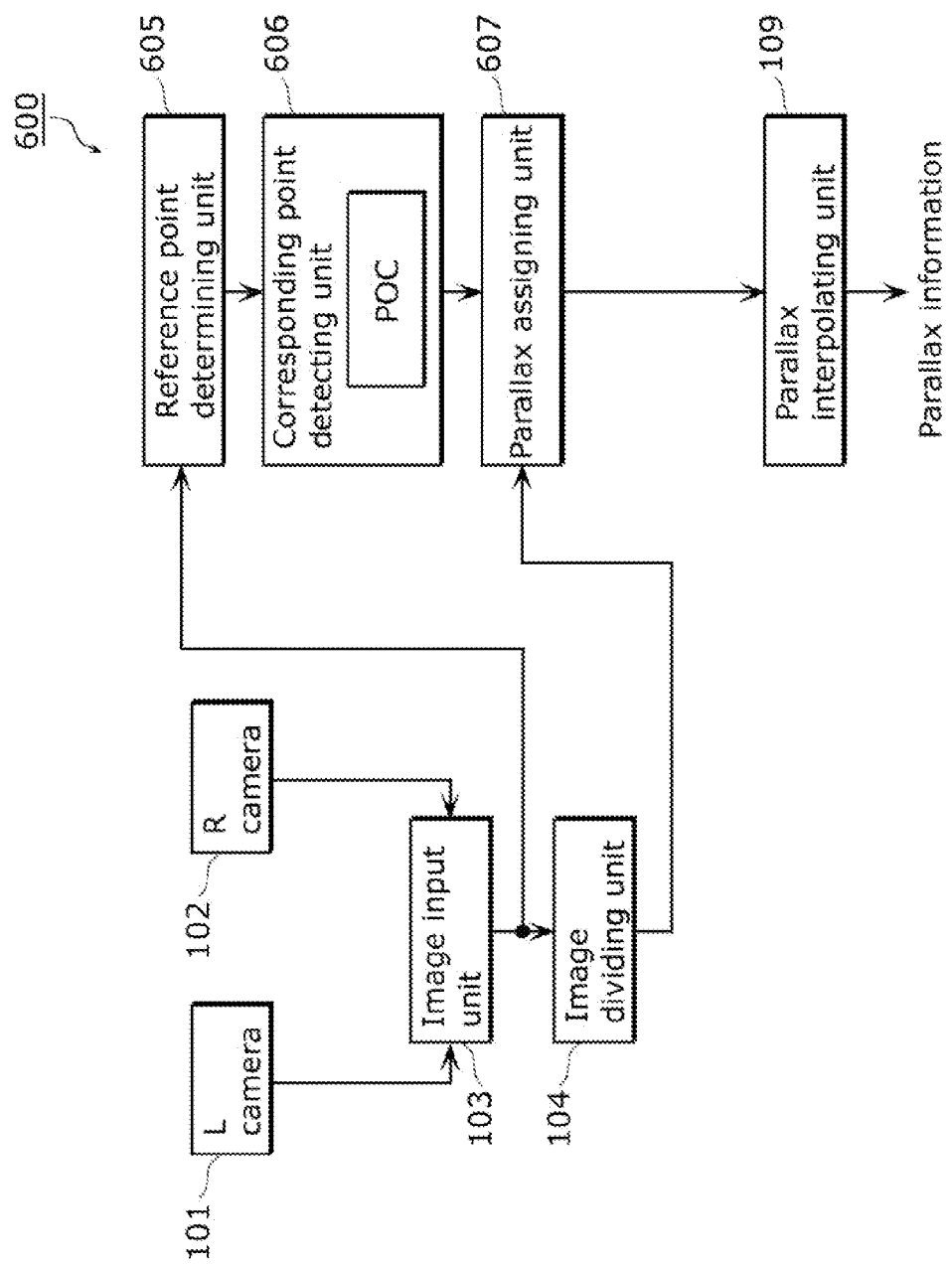
FIG. 15 is a block diagram of a disparity calculating apparatus according to Embodiment 6.
Figure 16:
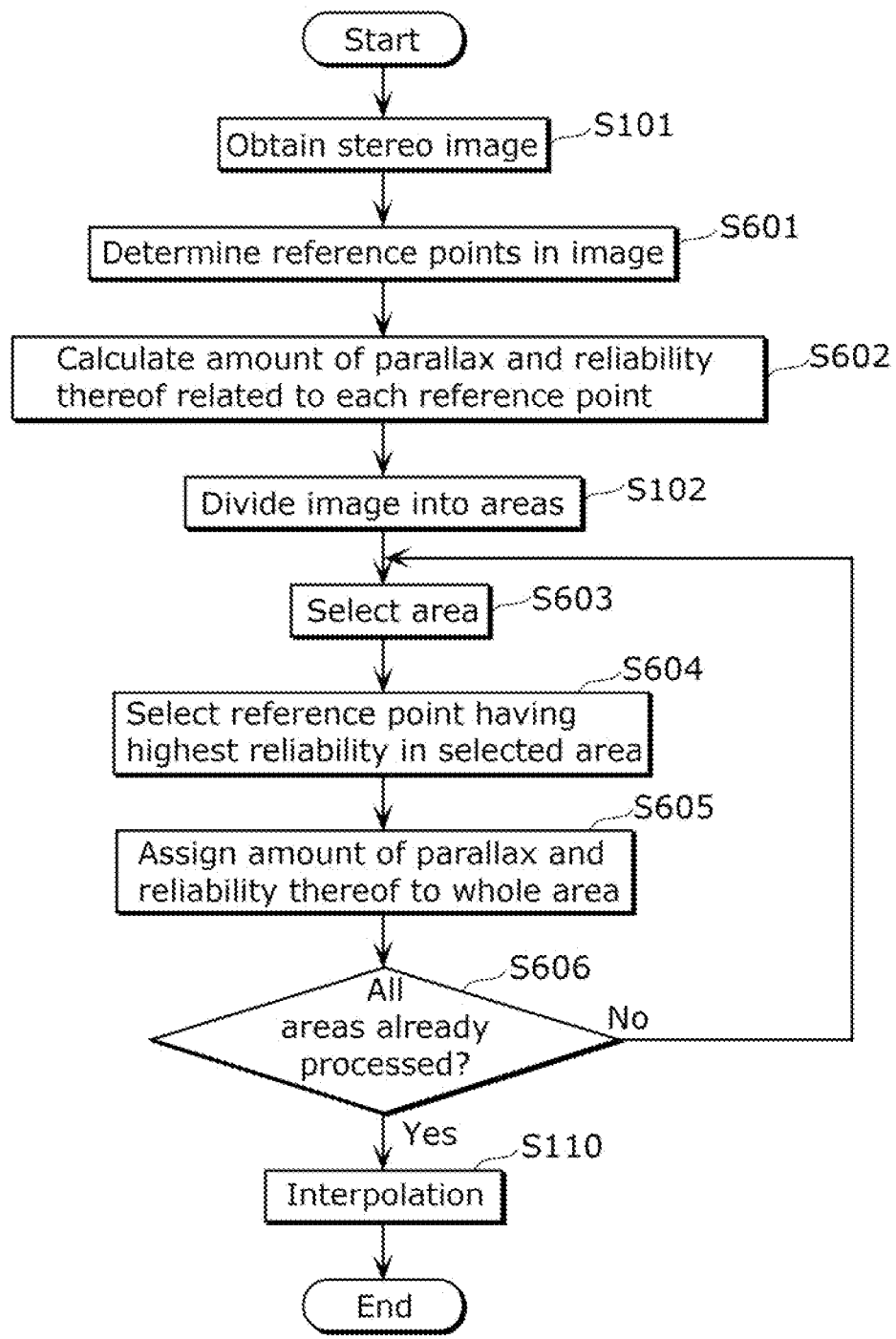
FIG. 16 is a flowchart of disparity calculation processes according to Embodiment 6.

FIG. 15 is a block diagram of the disparity calculating apparatus 600 according to this embodiment. In FIG. 15, the same structural elements as in FIG. 2 are assigned with the same reference numerals and are not described here. In addition, FIG. 16 is a flowchart of disparity value calculating processes performed by the disparity calculating apparatus 600.

The disparity calculating apparatus 600 shown in FIG. 15 includes a reference point determining unit 605, a corresponding point detecting unit 606, and a disparity assigning unit 607 having functions different from those of the equivalents in the structure shown in FIG. 6. In addition, the disparity calculating apparatus 600 does not include the reliability determining unit 208.

In each of the above embodiments, the reference point determining unit, the corresponding point detecting unit, and the disparity assigning unit perform their processing in cooperation for each of small segments. However, in this embodiment, the reference points are set in an image irrespective of division into small segments. Thus, the corresponding point detecting unit 606 sequentially performs processes for the respective reference points. In addition, the disparity assigning unit 607 sequentially performs processes for segments.

First, the image input unit 103 obtains a stereo image (S101). The image input unit 103 outputs the obtained stereo image to an image dividing unit 104 and the reference point determining unit 605.

The reference point determining unit 605 sets a plurality of reference points on the image (S601). As an exemplary one of conceivable setting methods, a reference point is set for each vertical ny pixel and for each horizontal nx pixel within the image. The reference point determining unit 605 performs, as necessary, initial settings for a first window size and a second window size in the same manner as performed by the reference point determining unit 205.

Next, the corresponding point detecting unit 606 calculates the corresponding point for each reference point, using POC or another method (such as BM) (S602). It is to be noted that details of these processes are the same as in the above embodiments. The calculation result is a table storing the combinations of the disparity values and the reliabilities thereof assigned to the respective reference points.

On the other hand, the image dividing unit 104 divides one of images included in the stereo image into small segments as in the above embodiments (S102). The division result is output to the disparity assigning unit 607. It is to be noted that this process may be performed before or simultaneously with S601 or S602 as long as after Step S101.

Next, the disparity assigning unit 607 assigns small segments including the reference points the disparity values and the reliabilities thereof calculated by the corresponding point detecting unit 606.

More specifically, first, the disparity assigning unit 607 selects any of the small segments as a selected segment (S603). Next, the disparity assigning unit 607 selects the reference point having the highest priority among the at least one reference point in the selected segment (S604). Next, the disparity assigning unit 607 assigns the disparity value and the reliability thereof related to the selected reference point to the whole selected segment (S605). In addition, these sequential processes are performed on each small segment (S606).

More specifically, when two or more reference points are assigned to a current small segment, the disparity assigning unit 607 stores the two or more reference points assigned to the current small segment. The disparity assigning unit 607 extracts, from among the small segments, small segments each assigned with two or more combinations of the disparity values and the reliabilities thereof after the completion of the process of assigning all the reference points to the small segments, and determines, as the disparity values and the reliabilities thereof related to the target small segment, the combination having the highest reliability among the combinations assigned to the small segment.

On the other hand, if no reference point is assigned to a selected segment, the disparity assigning unit 607 sets a minimum reliability to the selected segment.

In this way, the disparity calculating apparatus 600 divides an image into small segments having edge shapes through the image dividing process. In addition, the disparity calculating apparatus 600 determines a plurality of reference points on the whole image, and calculates disparity values by detecting corresponding points for the respective reference points and also calculates the reliabilities thereof. Next, the disparity calculating apparatus 600 assigns the calculated disparity values and reliabilities to the small segments including the reference points. In this way, the disparity calculating apparatus 600 can calculate the disparity value having a high reliability by combining the results obtained based on the reference points. In addition, the disparity calculating apparatus 600 can cause the disparity interpolating unit 109 to replace the disparity value related to a small segment having a low reliability with the disparity value having a high reliability, based on the disparity values and the reliabilities related to surrounding small segments having high reliabilities. Thus, the disparity calculating apparatus 600 can obtain highly accurate disparity values with the edge shapes maintained as a whole.

In the above description, when the disparity values and the reliabilities are assigned to the selected segment, the disparity assigning unit 607 assigns the combination having the highest reliability to the selected segment. However, it is to be noted that the disparity assigning unit 607 may calculate a disparity value and the reliability thereof to be assigned, based on the disparity values and the reliabilities thereof. For example, the disparity assigning unit 607 may calculate the disparity value to be assigned by selecting, from among the combinations, one or more combinations each having a reliability higher than a threshold value and calculating a linear weighted sum of the disparity values included in the selected combinations, based on the reliabilities thereof. In addition, the disparity assigning unit 607 may calculate, as the reliability to be assigned, the average value of the reliabilities included in the selected combinations. It is to be noted that the disparity assigning unit 607 may simply calculate, as the disparity value to be assigned, the average of the disparity values included in the selected combinations, instead of performing the weighted sum based on the reliabilities.

In the description, the reference point determining unit 605 sets the reference points at equal intervals, but it is possible to set the reference points at random.

In addition, when three or more reference points having a reliability higher than or equal to a threshold value are included in the combinations of the disparity values and the reliabilities thereof, the disparity assigning unit 607 may calculate a three-dimensional plane composed of X and Y coordinates and the disparity values Z on an image and presenting a two-dimensional distribution of the disparity values, and assign the calculation result to the whole selected segment. In addition, when two or less reference points having a reliability higher than or equal to the threshold value is included, the disparity assigning unit 607 may assign the combination having the highest reliability to the whole selected segment. It is to be noted that the specific method of calculating the three-dimensional plane is, for example, the same as in Embodiment 5.

In the above description, the corresponding point detecting unit 606 calculates a table of combinations of the disparity values and the reliabilities thereof assigned for the respective reference points. However, it is possible to directly assign the disparity values and the reliabilities thereof to the table of the small segments output by the image dividing unit 104.

Embodiment 7

This embodiment relates to a modified example of the disparity calculating apparatus 600 according to Embodiment 6 described above. The disparity calculating apparatus according to this embodiment determines a disparity value to be assigned to a selected segment, using the ratio between the segment size of a first search window and a first segment size.

Figure 17:
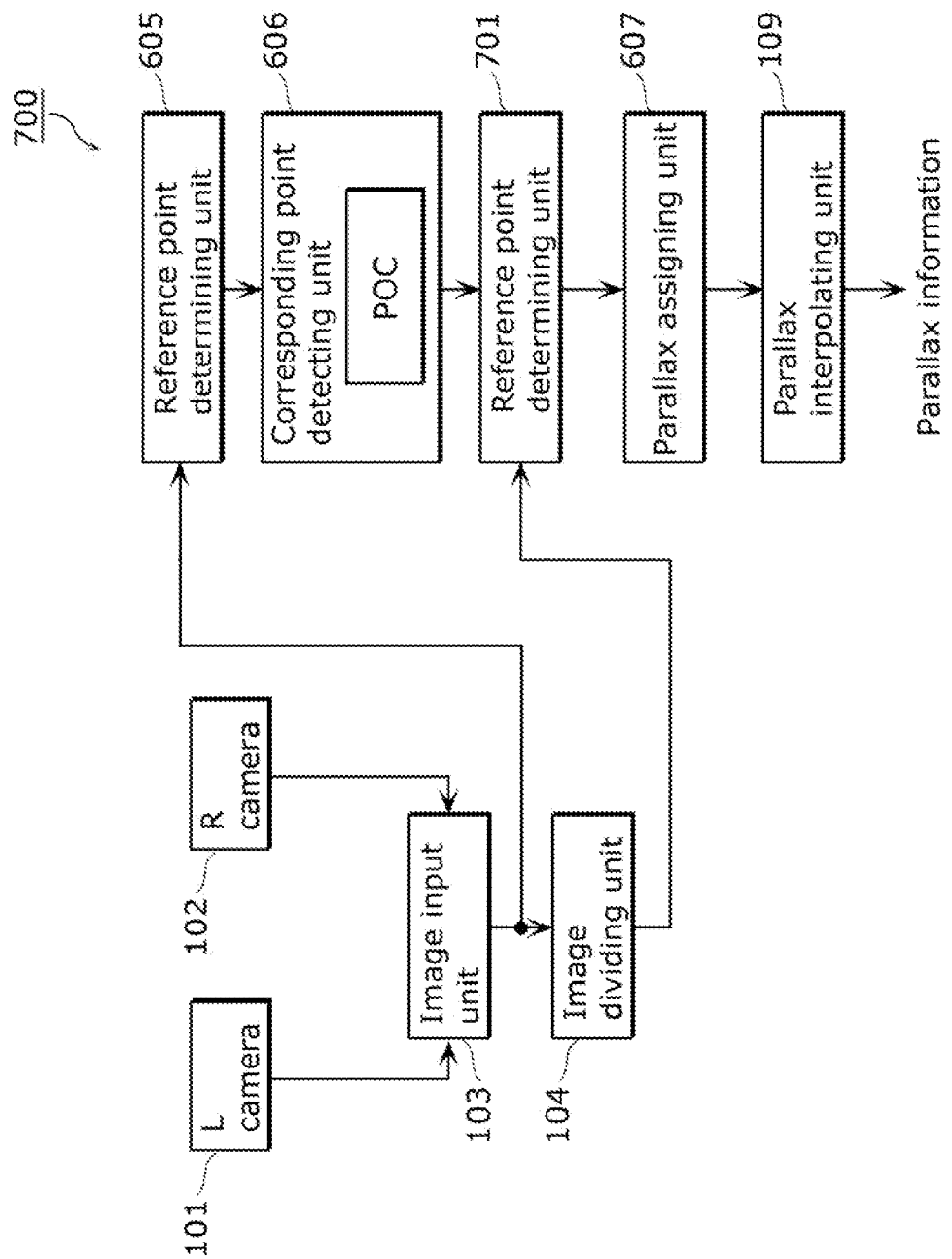
FIG. 17 is a block diagram of a disparity calculating apparatus according to Embodiment 7.
Figure 18:
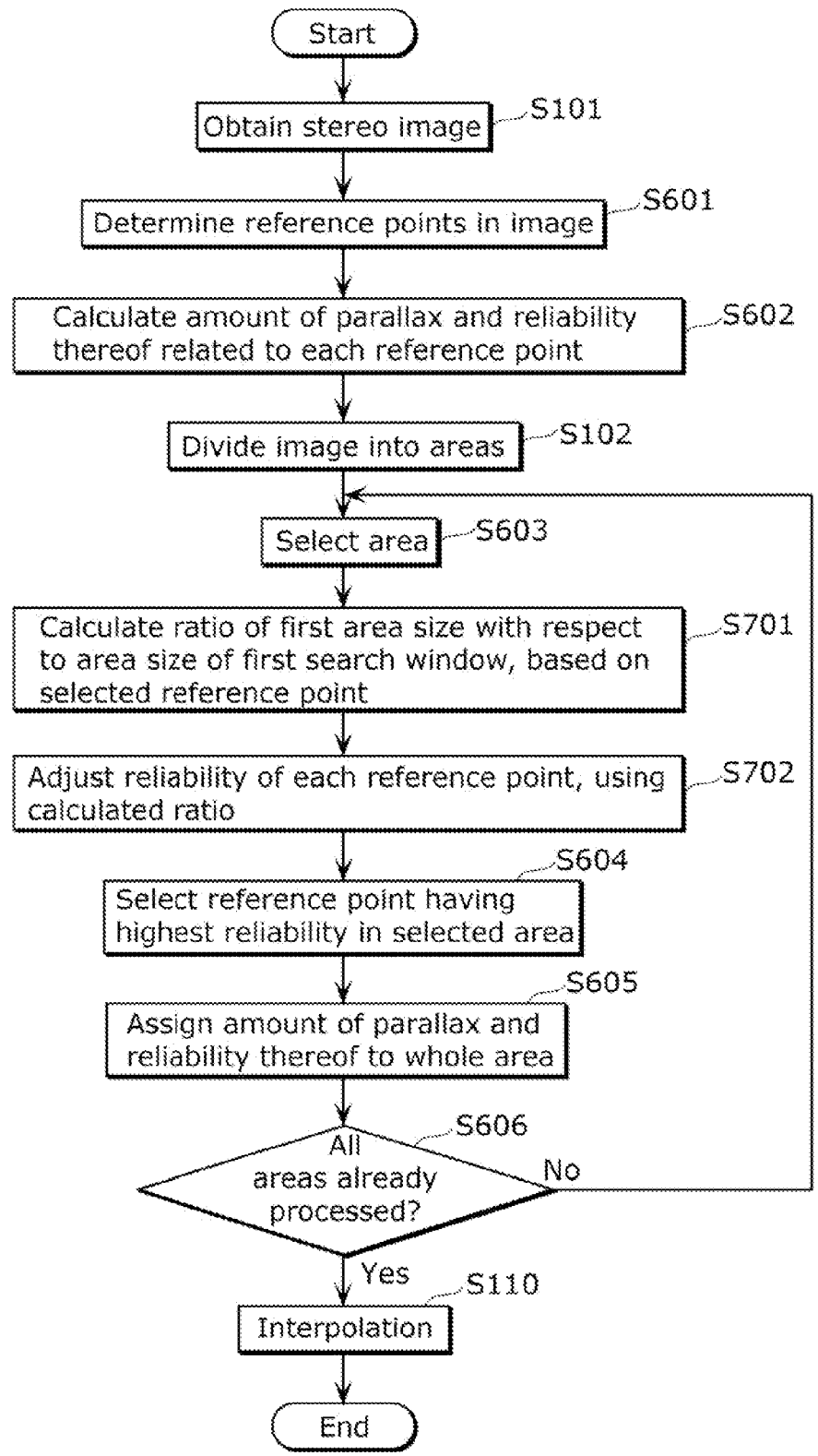
FIG. 18 is a flowchart of disparity calculation processes according to Embodiment 7.

FIG. 17 is a block diagram of the disparity calculating apparatus 700 according to this embodiment. In FIG. 17, the same structural elements as in FIG. 15 are assigned with the same reference numerals and are not described here. In addition, FIG. 18 is a flowchart of disparity value calculating processes performed by the disparity calculating apparatus 700.

The disparity calculating apparatus 700 shown in FIG. 17 includes a reference point deciding unit 701 in addition to the structure shown in FIG. 15. The reference point deciding unit 701 modifies the reliability of each of reference points processed by the corresponding point detecting unit 606, based on segmentation information generated by the image dividing unit 104.

The reference point deciding unit 701 modifies, for each reference point, the reliability among the disparity value and the reliability assigned by the corresponding point detecting unit 606. First, the reference point deciding unit 701 sets, for each reference point, a first search window (a first surrounding segment) having a center which is the reference point. Next, the reference point deciding unit 701 calculates the first segment size which indicates to what degree the target small segment including the reference point is included within the first search window. In other words, the first segment size is the segment size of a portion which is of the selected segment and is included in the first search window. Next, the reference point deciding unit 701 calculates the first segment size and the ratio of the first segment size with respect to the segment size of the first search window (S701). Next, the reference point deciding unit 701 modifies the reliability based on the ratio. More specifically, when the calculated ratio is smaller than a threshold value, the reference point determining unit 701 decreases the reliability assigned by the corresponding point detecting unit 606 according to a certain law. In other words, the reference point deciding unit 701 decreases the reliability more significantly as the ratio of the first segment size with respect to the segment size of the first search window is smaller. The disparity assigning unit 607 assigns the small segment the reliability modified by the reference point deciding unit 701 and the disparity value.

As known from this, when an segment different from the selected segment is largely included in the first search window, even with a high reliability among the reliability assigned by the corresponding point detecting unit 606 and the disparity value, the assigned disparity value may be affected by the disparity value related to the different segments. Thus, in such a case, the reference point deciding unit 701 decreases the reliability assigned by the corresponding point detecting unit 606.

In this way, when a reference point near an segment boundary is selected, it is possible to reduce the possibility that the disparity assigning unit 607 selects the disparity value and the reliability thereof reflecting information of the segment different from the selected segment. In other words, it is possible to reduce the possibility that the disparity value of the different segment is selected as the disparity value of the selected segment.

In addition, it is possible to further reduce the possibility that the disparity assigning unit 607 selects a reference point near an segment boundary by increasing the first search window size to a size larger than the minimum size Ws0 and adjusting the threshold value for determining whether or not to decrease the reliability to a comparatively high threshold value. In this way, it is possible to prevent the accuracy of the POC from decreasing.

The disparity calculating apparatuses according to the embodiments of the present disclosure have been described above, but the present disclosure is not limited to the embodiments.

The processing units included in each of the disparity calculating apparatuses according to the embodiments may be configured with an LSI. These processing units may be made as separate individual chips, or as a single chip to include a part or all thereof.

The means for circuit integration is not limited to an LSI, and implementation with a dedicated circuit or a general-purpose processor is also available. It is also possible to use a Field Programmable Gate Array (FPGA) that is programmable after the LSI is manufactured, and a reconfigurable processor in which connections and settings of circuit cells within the LSI are reconfigurable.

Each of the structural elements in each of the above-described embodiments may be configured in the form of an exclusive hardware product, or may be realized by executing a software program suitable for the structural element.

Each of the structural elements may be realized by means of a program executing unit, such as a CPU and a processor, reading and executing the software program recorded on a recording medium such as a hard disk or a semiconductor memory. Here, the software program for realizing the disparity calculating apparatus according to each of the embodiments is a program described below.

In other words, the program is a program causing a computer to execute the steps of: dividing the first image into a plurality of segments having consecutive and similar pixel values; setting a plurality of reference points in the first image; (i) calculating, for each of the reference points, a corresponding point which is included in the second image and corresponds to the reference point, based on phase information of images obtained by performing Fourier transform on a first segment of the first image and second segments of the second image, (ii) calculating a disparity value using the reference point and the corresponding point, and (iii) calculating a reliability of the disparity value, the first segment having a center which is the reference point and having a search window size, and each of the second segments having a center which is a corresponding point candidate and having the search window size; and assigning each of the segments which includes a corresponding one of the reference points the disparity value and the reliability calculated for the reference point in the calculating of a corresponding point.

In addition, all of the numerals used above are examples for specifically explaining the present disclosure, and thus the present disclosure is not limited to the exemplary numerals.

In addition, the functional blocks divided in each of the block diagrams are examples. It is also possible to implement some of the functional blocks as a single functional block, or to implement one of the functional blocks into a plurality of blocks divided therefrom, or to transfer some of the functions to one or more other blocks. In addition, the functions of the plurality of functional blocks having similar functions may be exerted in parallel or in time division by a single hardware item or software item.

In addition, the execution order of the steps of the disparity calculating method in each embodiment is an example for specifically illustrating the present disclosure, and other orders are also possible. In addition, some of the steps may be executed simultaneously (in parallel) with one or more other steps.

The respective exemplary embodiments have been described above. The scope of the Claims of the present application is not limited to these embodiments. Those skilled in the art will readily appreciate that many modifications are possible in the embodiments and other embodiments may be obtained by arbitrarily combining the structural elements of the embodiments without materially departing from the novel teachings and advantages of the subject matter of the attached Claims. Accordingly, all such modifications and other embodiments are intended to be included within the present disclosure.

INDUSTRIAL APPLICABILITY

The present disclosure is applicable to disparity calculating apparatuses. In addition, the present disclosure is applicable to for example, obtain a solid-shape three-dimensional model.

The invention claimed is:

1. A disparity calculating apparatus which calculates disparity values from a stereo image including a first image and a second image, the disparity calculating apparatus comprising:
    an image dividing unit configured to divide the first image into a plurality of segments having consecutive and similar pixel values;
    a reference point determining unit configured to set a plurality of reference points in the first image;
    a corresponding point detecting unit configured to (i) calculate, for each of the reference points, a corresponding point which is included in the second image and corresponds to the reference point, based on phase information of images obtained by performing Fourier transform on a first segment of the first image and second segments of the second image, (ii) calculate a disparity value using the reference point and the corresponding point, and (iii) calculate a reliability of the disparity value, the first segment having a center which is the reference point and having a search window size, and each of the second segments having a center which is a corresponding point candidate and having the search window size; and
    a disparity assigning unit configured to assign each of the segments which includes a corresponding one of the reference points the disparity value and the reliability calculated for the reference point by the corresponding point detecting unit.

2. The disparity calculating apparatus according to claim 1, further comprising
    a reliability determining unit configured to determine, for each of the segments, whether or not the assigned reliability is lower than a predetermined threshold value, and when the reliability assigned to a current one of the segments is lower than the threshold value, to give one of the reference point determining unit, the corresponding point detecting unit, and the disparity assigning unit an instruction for causing calculation, based on a modified condition, of a disparity value using the reference point and the corresponding point and a reliability of the disparity value.

3. The disparity calculating apparatus according to claim 2, wherein the reference point determining unit is configured:
    to set a plurality of reference point candidates in each of the segments;
    to set, for each reference point candidate, a first surrounding segment of a first size having a center which is the reference point candidate, and a second surrounding segment of a second size having a center which is the reference point candidate, the second size being larger than the first size;
    to calculate, for each reference point candidate, a first segment size of a portion of the segment including the reference point candidate, the portion being included in the first surrounding segment;
    to calculate, for each reference point candidate, a second segment size of a portion of the segment including the reference point candidate, the portion being included in the second surrounding segment;
    to set, for each segment, priorities of the reference point candidates such that a higher priority is given for the reference point candidate having a larger first segment size, and when two or more of the first segment sizes are equal, a higher or highest priority is given for the reference point candidate having a larger or largest second segment size; and to select, based on the priorities, the reference point in each segment from among the reference point candidates.

4. The disparity calculating apparatus according to claim 3, wherein the first size is equal to the search window size.

5. The disparity calculating apparatus according to claim 4, wherein the corresponding point detecting unit is configured to calculate the corresponding point using a method other than a calculation method based on the phase information, when a ratio of the first segment size with respect to the segment size of the first surrounding segment is smaller than a predetermined value.

6. The disparity calculating apparatus according to claim 3, wherein, when the ratio of the first segment size of the portion of the segment which is a current processing target with respect to the segment size of the first surrounding segment is smaller than a predetermined value, the reference point determining unit is configured to combine the current processing-target segment and one of neighboring segments which has color information similar to color information of the processing-target segment, and determine the reference point in the combined segment.

7. The disparity calculating apparatus according to claim 3, wherein, when the reliability assigned to the current segment is lower than the threshold value, the reference point determining unit is further configured to set a new reference point selected from among the reference point candidates, based on the priorities used as the modified condition, the corresponding point detecting unit is configured to calculate a new corresponding point for the new reference point, calculate a disparity value using the new reference point and the new corresponding point, and calculate a reliability of the disparity value, and the disparity assigning unit is configured to assign the current segment the disparity value and the reliability newly calculated by the corresponding point detecting unit.

8. The disparity calculating apparatus according to claim 3, wherein, when the reliability assigned to the current segment is lower than the threshold value, the reference point determining unit is configured to reset the priorities to new priorities based on a modified first size obtained by increasing the first size, and set a reference point based on the modified priorities used as the modified condition, the corresponding point detecting unit is configured to calculate a new corresponding point for the new reference point, calculate a disparity value using the new reference point and the new corresponding point, and calculate a reliability of the disparity value, and the disparity assigning unit is configured to assign the current segment the disparity value and the reliability newly calculated by the corresponding point detecting unit.

9. The disparity calculating apparatus according to claim 3, wherein the reference point determining unit is configured to determine, for each segment, two or more reference points selected from among the plurality of reference point candidates, based on the priorities, the corresponding point detecting unit is configured to calculate, based on the phase information, the corresponding point for each of the reference points in each segment, calculate a disparity value using the reference point and the corresponding point, and calculate a reliability of the disparity value, and the disparity assigning unit is configured:

to assign each segment a combination of a disparity value and reliability which is a highest reliability, selected from among combinations of the disparity values and the reliabilities calculated for the respective reference points in the segment by the corresponding point detecting unit; and when the reliability assigned to the current segment is lower than the threshold value, to newly calculate a disparity value and a reliability by performing weighted sum of the disparity values included in the combinations calculated for the current segment, based on the reliabilities, and assign the current segment the disparity value and the reliability, the weighted sum being performed as the modified condition.

10. The disparity calculating apparatus according to claim 9, wherein, when the reliability assigned to the current segment is lower than the threshold value, the disparity assigning unit is configured to newly calculate the disparity value and the reliability for the current segment by performing weighted sum of the disparity values included in the combinations calculated for the current segment, based on the reliabilities and a ratio of the second segment with respect to the second surrounding segment.

11. The disparity calculating apparatus according to claim 9, wherein the corresponding point detecting unit is configured to calculate the corresponding point for each of the reference points, based on phase information of images obtained by performing Fourier transform on one-dimensional images respectively included in the first image and the second image, and when the reliability assigned to the current segment is lower than the threshold value, the disparity assigning unit is configured to newly calculate the disparity value and the reliability for the current segment by performing, based on the reliabilities, weighted sum of the disparity values included in the combinations calculated for the current segment, and assign the current segment the disparity value and the reliability.

12. The disparity calculating apparatus according to claim 1, wherein the reference point determining unit is configured to a plurality of reference points in each segment, the corresponding point detecting unit is configured to calculate the corresponding point for each of the reference points in each of the segments, based on phase information of images obtained by performing Fourier transform on a plurality of the images respectively included in the first image and the second image, calculate a disparity value using the reference point and the corresponding point, and calculate a reliability of the disparity value, and the disparity assigning unit is configured to (i) determine, for each of the reference points calculated for each segment by the corresponding point detecting unit, whether or not there are three or more combinations of disparity values and reliabilities which are reliabilities higher than a predetermined threshold value, and, when the three or more combinations having the reliabilities higher than the predetermined threshold value exist in a current one of the segments, (ii) calculate a two-dimensional distribution of the disparity values related to the current segment using the three or more combinations, and (iii) assign the current segment the two-dimensional distribution of the disparity values.

13. The disparity calculating apparatus according to claim 1, further comprising
a reference point deciding unit configured to modify the reliability calculated by the corresponding point detecting unit,
wherein the reference point deciding unit is configured:
to set, for each reference point, a first surrounding segment having a center which is the reference point;
to calculate a first segment size of a portion of the segment including the reference point, the portion being included in the first surrounding segment; and
to decrease the reliability more significantly as a ratio of the first segment size with respect to the first surrounding segment becomes smaller, and
the disparity assigning unit is configured to assign the segment the reliability modified by the reference point deciding unit and the disparity value.

14. A disparity calculating method of calculating disparity values from a stereo image including a first image and a second image, the disparity calculating method comprising
dividing the first image into a plurality of segments having consecutive and similar pixel values;
setting a plurality of reference points in the first image;
(i) calculating, for each of the reference points, a corresponding point which is included in the second image and corresponds to the reference point, based on phase information of images obtained by performing Fourier transform on a first segment of the first image and second segments of the second image, (ii) calculating a disparity value using the reference point and the corresponding point, and (iii) calculating a reliability of the disparity value, the first segment having a center which is the reference point and having a search window size, and each of the second segments having a center which is a corresponding point candidate and having the search window size; and
assigning each of the segments which includes a corresponding one of the reference points the disparity value and the reliability calculated for the reference point in the calculating of a corresponding point.

15. A non-transitory computer-readable recording medium having a program stored thereon for causing a computer to execute the disparity calculating method according to claim 14.

* * * * *